United States Patent [19]

Kobayashi et al.

[11] Patent Number: 5,719,859
[45] Date of Patent: Feb. 17, 1998

[54] TIME DIVISION MULTIPLE ACCESS RADIO COMMUNICATION SYSTEM

[75] Inventors: Takuya Kobayashi; Hiroaki Iwamoto, both of Osaka, Japan

[73] Assignee: Matsushita Electric Industrial Co., Ltd., Osaka-fu, Japan

[21] Appl. No.: 530,484

[22] Filed: Sep. 19, 1995

[51] Int. Cl.⁶ .................................................. H04B 7/212
[52] U.S. Cl. .......................... 370/347; 370/443; 455/54.2
[58] Field of Search ........................... 455/54.1, 54.2; 370/280, 329, 336, 337, 345, 347, 348, 442, 443, 468, 915

[56] References Cited

U.S. PATENT DOCUMENTS

| | | | |
|---|---|---|---|
| 4,763,322 | 8/1988 | Eizenhöfer | 370/337 |
| 4,972,506 | 11/1990 | Uddenfeldt | 370/337 |
| 5,200,956 | 4/1993 | Pudney et al. | 370/337 |
| 5,295,140 | 3/1994 | Crisler et al. | 370/443 |
| 5,307,348 | 4/1994 | Buchholz et al. | 370/348 |
| 5,377,192 | 12/1994 | Goodings et al. | 370/348 |
| 5,446,739 | 8/1995 | Nakano et al. | 370/337 |

FOREIGN PATENT DOCUMENTS 6417525  1/1989  Japan.

*Primary Examiner*—Benedict V. Safourek
*Attorney, Agent, or Firm*—Price, Gess & Ubell

[57] ABSTRACT

A radio communication system for performing communications between a base station and mobile stations by Time Division Multiple Access (TDMA) with a certain number of time slots in a frame. The distribution of time slots can be changed based on transmission rate, error occurrence rate, instruction of operators, etc. Communications can be performed using appropriate number of time slots.

12 Claims, 30 Drawing Sheets

FIG. 9

| signal type | [slot acquisition request] |
|---|---|
| mobile station | [e.g. : mobile station 12] |
| assignment condition | [e.g. : must be assigned using same carrier] |
| | |

FIG. 10

| signal type | [slot release request] |
|---|---|
| mobile station | [e.g. : mobile station 12] |
| released slot no. | [e.g. : slot 2、6] |
| | |

| slot no. | packet reception rate | mobile station |
|---|---|---|
| 1 | a | mobile station1(downward) |
| 2 | 0 | unassigned |
| 3 | b | mobile station2(downward) |
| 4 | 0 | unassigned |
| 5 | x | mobile station1(upward) |
| 6 | 0 | unassigned |
| 7 | y | mobile station2(upward) |
| 8 | 0 | unassigned | ch1   downward : slot1、upward : slot5
ch2   downward : slot2、upward : slot6

FIG. 14

| | |
|---|---|
| signal type | [slot assignment notification] |
| assigned slot | [slot no. e.g. : slot 2,6] |
| carrier | [carrier no.] |
| | |

FIG. 16

| signal type | [slot assignment rejection] |
|---|---|
| reason | [e.g. : assigned carrier can not be used] |
|  |  |

FIG. 21

| signal type | [signal release notification] |
|---|---|
| reason | [e.g. : decreased use rate] |
|  |  |

FIG. 26

| code | number of upward slots | number of downward slots |
|---|---|---|
| 0 | 0 | 8 |
| 1 | 1 | 7 |
| 2 | 2 | 6 |
| 3 | 3 | 5 |
| 4 | 4 | 4 |
| 5 | 5 | 3 |
| 6 | 6 | 2 |
| 7 | 7 | 1 |

FIG. 27

| | |
|---|---|
| signal type | [slot distribution change notification] |
| slot structure | [slot structure code] |
| destination address | |
| source address | |
| optional information | [e.g. : change time, slot assignment information] |

FIG. 30

| slot no. | frame | packet reception rate | mobile station |
|---|---|---|---|
| 1 | 1 | z(middle) | notification(downward) |
| 1 | 2 | z(middle) | notification(downward) |
| 2 | 1 | a(high) | mobile station302(downward) |
| 2 | 2 | a(high) | mobile station302(downward) |
| 3 | 1 | b(low) | mobile station303(downward) |
| 3 | 2 | b(low) | mobile station303(downward) |
| 4 | 1 | c(low) | mobile station304(downward) |
| 4 | 2 | c(low) | mobile station304(downward) |
| 5 | 1 | 0 | unassigned(upward) |
| 5 | 2 | 0 | unassigned(upward) |
| 6 | 1 | A(high) | mobile station302(upward) |
| 6 | 2 | A(high) | mobile station302(upward) |
| 7 | 1 | B(middle) | mobile station303(upward) |
| 7 | 2 | B(middle) | mobile station303(upward) |
| 8 | 1 | C(high) | mobile station304(upward) |
| 8 | 2 | C(high) | mobile station304(upward) |

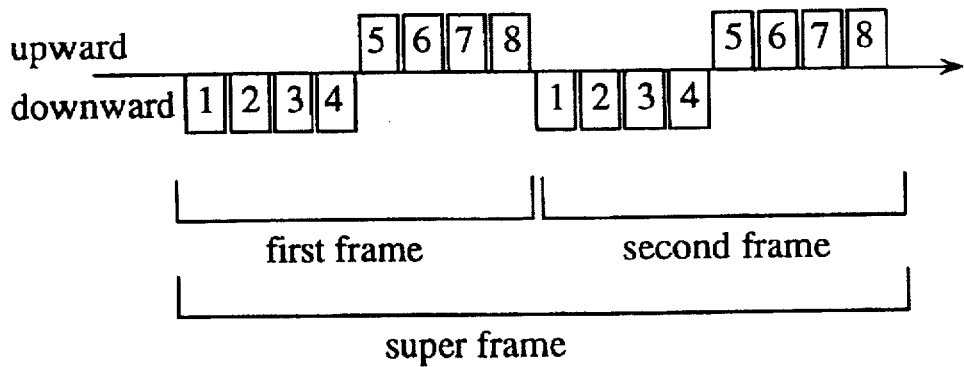

FIG. 31

| slot no. | frame | packet reception rate | mobile station | |
|---|---|---|---|---|
| 1 | 1 | z(middle) | notification(downward) | |
| | 2 | z(middle) | notification(downward) | |
| 2 | 1 | a(high) | mobile station302(downward) | |
| | 2 | a(high) | mobile station302(downward) | |
| 3 | 1 | 2b | mobile station303(downward) | |
| | 2 | 2c | mobile station303(downward) | |
| 4 | 1 | 0 | unassigned(upward) | upward slots are secured |
| | 2 | 0 | unassigned(upward) | |
| 5 | 1 | 0 | unassigned(upward) | |
| | 2 | 0 | unassigned(upward) | |
| 6 | 1 | A(high) | mobile station302(upward) | |
| | 2 | A(high) | mobile station302(upward) | |
| 7 | 1 | B(middle) | mobile station303(upward) | |
| | 2 | B(middle) | mobile station303(upward) | |
| 8 | 1 | C(high) | mobile station304(upward) | |
| | 2 | C(high) | mobile station304(upward) | | upward: 4 5 6 7 8    4 5 6 7 8
downward: 1 2 3    1 2 3 first frame | second frame super frame

TIME DIVISION MULTIPLE ACCESS RADIO COMMUNICATION SYSTEM

BACKGROUND OF THE INVENTION

1. Field of the Invention

This invention relates to a bidirectional Time Division Multiple Access (TDMA) radio communication system, and specifically relates to the assignment of time slots in the radio communication system.

2. Description of the Prior Art

TDMA is known as a method of accessing to one of multiple communication channels on a certain frequency band in a radio communication system. Adopting a bidirectional TDMA enables multiple communication on the same frequency. This method has been adopted in Personal Handy phone Systems (PHS) (RCR STD-28). The following is an explanation of TDMA with reference to the drawings.

FIG. 1 shows the structure of a radio communication system with bidirectional TDMA. The radio communication system includes base station 100 and mobile stations 101 and 102, which communicate with the base station 100.

FIG. 2 shows a frame structure of TDMA. In FIG. 2, S1 to S4 represent the upward time slots for communication from mobile stations to the base station, and S1 to S4 represent the downward time slots for communication from the base station to the mobile stations. The eight time slots, upward and downward, make one cycle, or frame. Bidirectional communication between base station 100 and mobile stations 101 and 102 is achieved by repeating the cycles. Note that the number of time slots per one frame is called the number of multiplex in TDMA.

In practice, time slots S1 and S1 are assigned for the communication between base station 100 and mobile station 101, and S2 and S2 for the communication between base station 100 and mobile station 102. Namely, a pair of upward and downward time slots are assigned to one mobile station. This means base station 100 can perform bidirectional communication with up to four mobile stations at the same time.

However, the above conventional TDMA method has the following problems:

(1) The conventional method assigns a pair of upward and downward time slots to one mobile station. Accordingly, when it is desired to transmit or receive a large quantity of data in a short period, it is impossible to communicate at a high speed exceeding the data transfer rate of a pair of time slots. This can not be changed even when there is only one mobile station communicating with the base station. Therefore, it takes a long time for the base station or mobile stations to transfer a large quantity of data between them.

(2) When either of the upward and downward communication traffics is far greater than the other one, it cannot be balanced. This is because upward and downward time slots assigned to a mobile station are occupied by the mobile station even if the mobile station hardly uses the time slots. As a result, there can be an inefficient occupation of the time slots, leading to the decrease of the communication efficiency.

(3) Furthermore, since the conventional TDMA defines the number of multiplex as eight, a maximum of only four mobile stations can communicate simultaneously. This means that when all the four time slots in one direction are being used, even with small communication traffic, other mobile stations desiring to communicate must wait for any mobile station in communication to end communication.

As a way to solve the above problems, communication method in which the number of multiplex or communication period of each time slot can be changed for each communication can be conceived. However, to realize such a method in the radio communication, too many technical problems must be cleared. That is, realizing such method would require ultra high-speed circuit elements or a complicate synchronization system to be provided on all the mobile stations.

SUMMARY OF THE INVENTION

The first object of the present invention, in consideration of the above mentioned problems, is to provide a TDMA radio communication system in which time slots are assigned efficiently without changing the number of multiplex or the period of each time slot, producing a high communication efficiency.

The second object of the present invention is to provide a flexible radio communication system which statically or dynamically secures the data transmission rate required by the mobile stations by responding to the instruction of the operator, change in communication traffic, or error occurrence rate of the communication data.

The third object of the present invention is to provide a highly functional radio communication system in which the communication efficiency is kept good even when either of upward and downward communication traffic is far greater than the other.

The fourth object of the present invention is to provide a useful radio communication system which does not have a limitation on the number of multiplex in TDMA, that is, does not have a limitation on the number of mobile stations in a simultaneous communication.

The first object is achieved by a radio communication system comprising a base station and a plurality of mobile stations for performing communications by Time Division Multiple Access (TDMA) with a certain number of time slots per one frame, the base station comprising: a time slot assigning unit for assigning an appropriate number of time slots to any of the plurality of mobile stations according to necessity; an assignment notifying unit for sending a notification of an assignment by the time slot assigning unit to the mobile stations; and a first TDMA unit for performing multiple communications with the plurality of mobile stations using the time slots assigned by the time slot assigning unit, and each mobile station comprising: an assignment obtaining unit for obtaining the notification from the base station; and a second TDMA unit for performing communications with the base station using the time slots assigned by the assignment obtaining unit. In this radio communication system, as many time slots as the communication requires are assigned to the mobile station.

The second object is achieved by the above radio communication system in which the base station further comprises a transmission rate calculating unit for calculating the transmission rate of communication data for each time slot, the time slot assigning unit assigning the appropriate number of time slots to the mobile stations based on the transmission rate calculated by the transmission rate calculating unit. The base station of the radio communication system may further comprise an inputting unit for receiving the transmission rate specified by an operator, and the time slot assigning unit may assign the time slots based on the transmission rate received by the inputting unit. The base station of the radio communication system may further comprise an error occurrence rate calculating unit for calculating an error occurrence rate on received data for each time slot, and the time slot assigning unit may assign the time slots based on the error occurrence rate calculated by the error occurrence calculating unit. The data transmission rate required by the mobile stations is secured based on the instruction of the operator, change in communication traffic, or error occurrence rate of the communication data.

The third object is achieved by the radio communication system wherein the time slot specifying unit specifies time slots with communication direction different from that of the time slot judged by the first judging unit that its transmission rate exceeds the first threshold value. The radio communication system uses time slots by converting them from downward communication to upward communication when upward communication requires higher data transmission rate. The radio communication system uses time slots by converting them from upward communication to downward communication when downward communication requires higher data transmission rate. As a result, the number of upward and downward time slots changes according to the appropriate data transmission rate.

The fourth object is achieved by the radio communication system in which the radio communication system performs communications with superframes, a superframe is made of a plurality of the frames, the time slot specifying unit specifies time slots with the lowest transmission rates in a certain frame in the superframe, and the first assigning unit assigns time slots in other frames in the superframe which correspond to the time slots specified by the time slot specifying unit. The time slot assigning unit of the radio communication system may further comprises: a second judging unit for judging whether the transmission rate calculated by the transmission rate calculating unit is below a second threshold value; and a second assigning unit for decreasing the number of time slots in the same communication direction assigned to the mobile station when a time slot in the same communication direction assigned to the mobile station is judged by the second judging unit that its transmission rate is below the second threshold value. The radio communication system may perform communications with superframes, a the superframe is made of a plurality of the frames, and the second assigning unit assigns a certain time slot of the superframe to the mobile station if a time slot per frame has been assigned to the mobile station and releases the time slot having been assigned. In this radio communication system, two or more mobile stations use a time slot alternately, that is, one time slot is assigned to two or more mobile stations, when the data transmission rate required by these mobile stations is low.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 6(a)(b) and (c) respectively show synchronization signal, transmit/receive switch signal, and VCO signal output by timing controlling unit 502 based on the instruction of CPU 411.

FIGS. 6(d) shows the TDMA time slot composition made from signals shown in FIGS. 6(a)(b) and (c) by base station 301.

FIG. 9 shows the contents of a time slot acquisition request of the First Embodiment of the present invention.

FIG. 10 shows the contents of a time slot release request of the First Embodiment of the present invention.

FIG. 14 shows the contents of a time slot assignment notification of the First Embodiment of the present invention.

FIG. 16 shows the contents of a time slot assignment rejection of the First Embodiment of the present invention.

FIG. 21 shows the contents of a time slot release notification of the First Embodiment of the present invention.

FIG. 26 shows the contents of the information table in memory 412 for setting time slot distribution ratio of the Second Embodiment of the present invention.

FIG. 27 shows the contents of a time slot distribution change notification of the Second Embodiment of the present invention.

FIG. 30 shows the contents of the information table in memory 412 for controlling the time slots of the base station of the Third Embodiment of the present invention.

FIG. 31 shows the contents of the information table shown in FIG. 30 after an update.

DESCRIPTION OF THE PREFERRED EMBODIMENTS

<First Embodiment>

Figure 1:
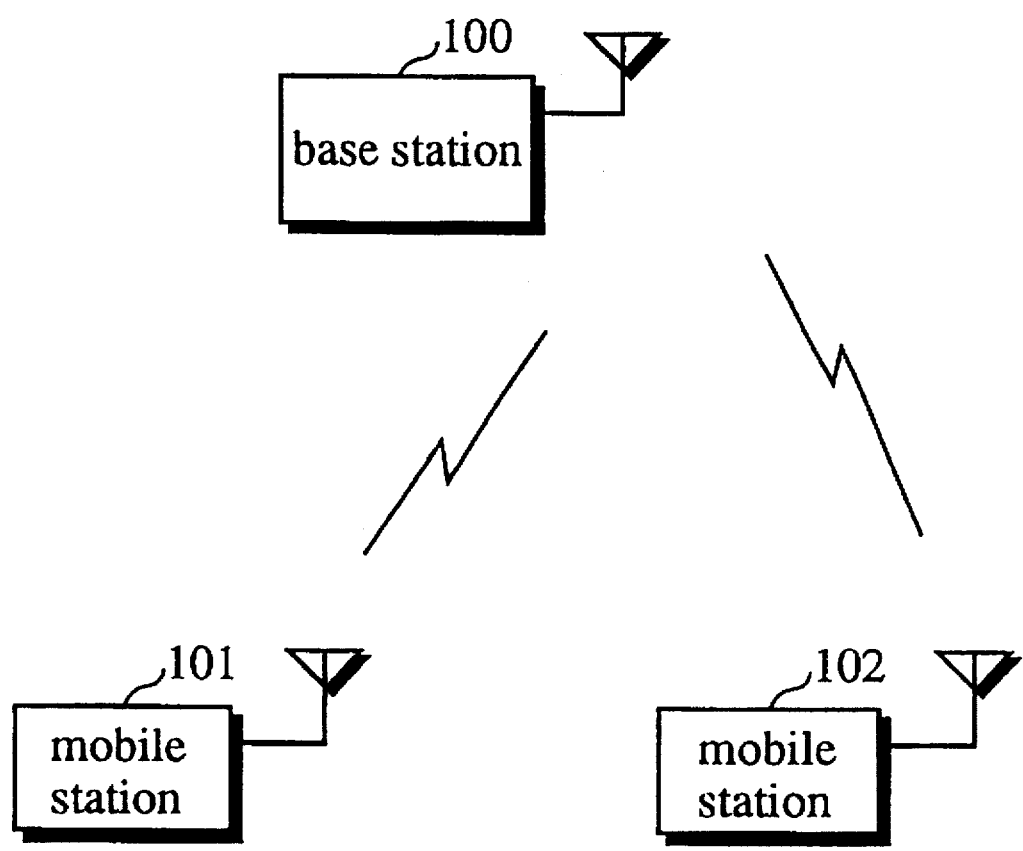
FIG. 1 is a block diagram illustrating the overall structure of a prior-art mobile radio communication system.
Figure 2:
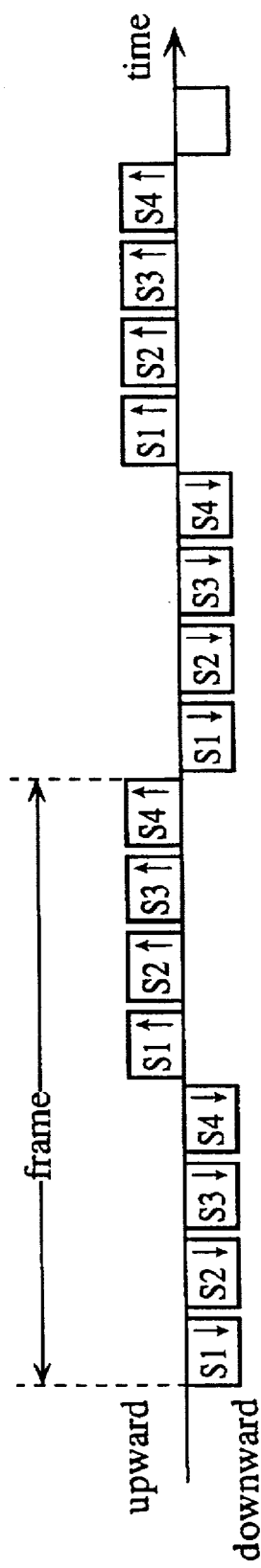
FIG. 2 shows the time slot composition in a prior-art TDMA method.
Figure 3:
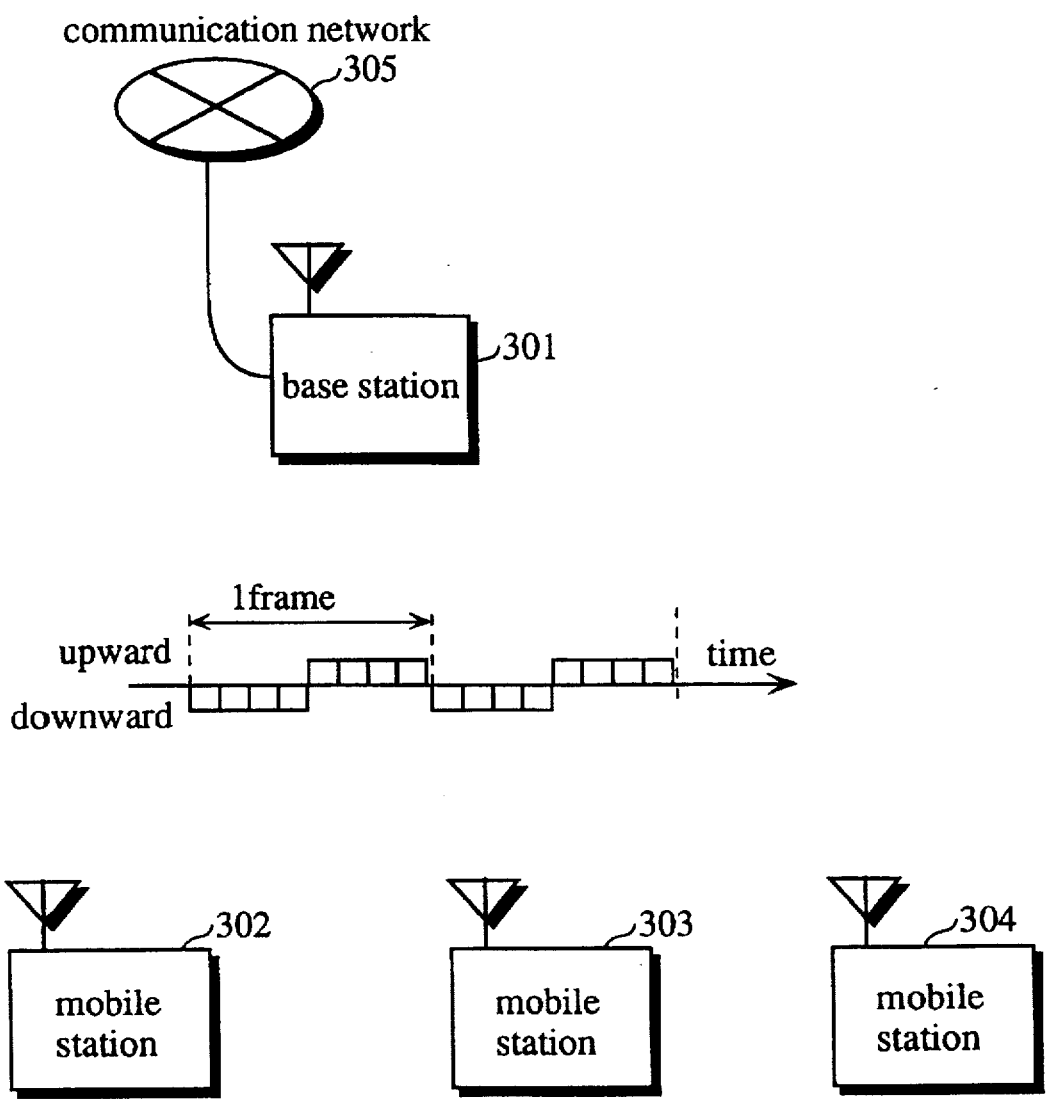
FIG. 3 is a block diagram illustrating the overall structure of the radio communication system of the First Embodiment of the present invention.

FIG. 3 is a block diagram illustrating the structure of the mobile radio communication system of the First Embodiment of the present invention. The mobile radio communication system of FIG. 3 includes base station 301, and three mobile stations 302, 303, and 304, located inside the radio communication zone of the base station 301. The base station 301 is connected to communication network 305 via certain communication paths. The communication network 305 uses communication lines such as telephone or radio networks. TDMA communication with eight time slots in one frame, the same as the conventional TDMA communication, is performed between base station 301 and mobile stations 302, 303, and 304. Each of mobile stations 302, 303, and 304 has its own mobile station number for identification.

Figure 4:
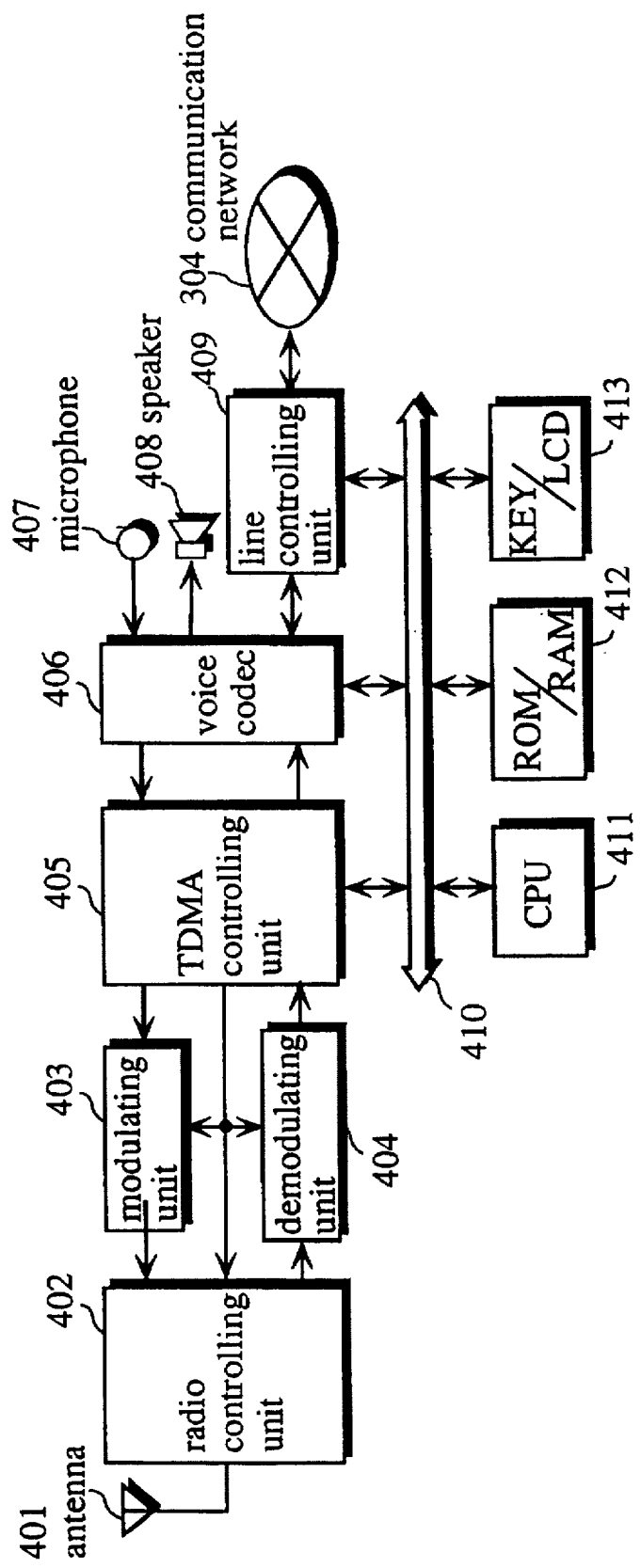
FIG. 4 is a block diagram illustrating the structure of the base station of the First Embodiment of the present invention.

FIG. 4 is a block diagram showing the internal structure of base station 301 in FIG. 3. Base station 301 includes antenna 401, radio controlling unit 402, modulating unit 403, demodulating unit 404, TDMA controlling unit 405, voice codec 406, microphone 407, speaker 408, line controlling unit 409, bus 410, CPU 411, memory 412, and input/output unit 413.

Antenna 401 is used for transmitting/receiving radio signal between base station 301 and mobile stations 302, 303, and 304.

Radio controlling unit 402 includes the AMP, filter, and the Voltage Controlled Oscillator (VCO). Radio controlling unit 402 transmits/receives the radio signal according to the instructions by TDMA controlling unit 405 with specified timing, carrier frequency, and operation mode (transmission or reception).

Modulating unit 403 and demodulating unit 404, as radio controlling unit 402, also modulate or demodulate the radio signal according to the instructions by TDMA controlling unit 405.

Figure 5:
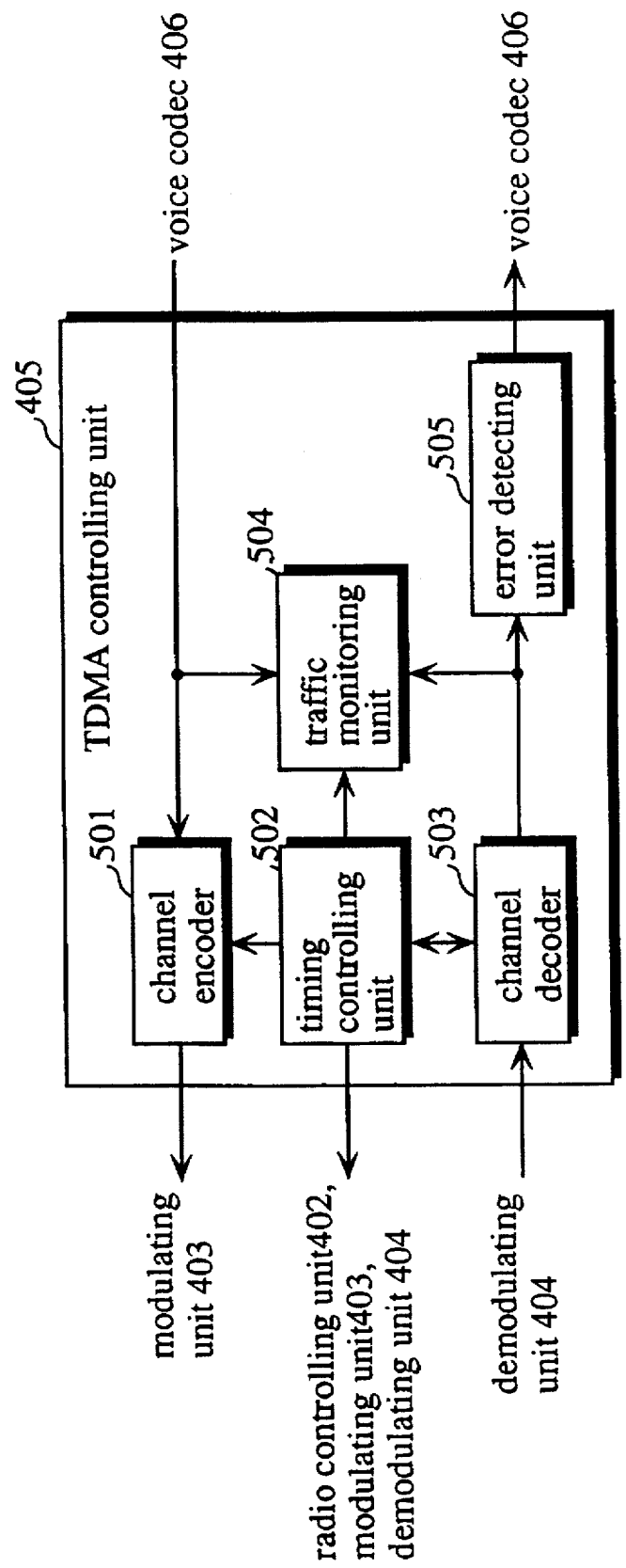
FIG. 5 is a block diagram illustrating the structure of TDMA controlling unit 405 of the base station of the First Embodiment of the present invention.

TDMA controlling unit 405, as FIG. 5 shows, includes channel encoder 501 for multiplexing the transmitted data in time division, channel decoder 503 for separating the received data in time division, traffic monitoring unit 504 for monitoring the traffic of the received data for each time slot, error detecting unit 505 for detecting the error of the received data for each time slot, and timing controlling unit 502 for controlling the operation timing and synchronization of the components, where traffic denotes the data transfer rate or the quantity of transferred data per a certain time period, traffic being calculated at each data transmission or reception of each time slot and being equal to the use rate of the time slot.

Figure 6:
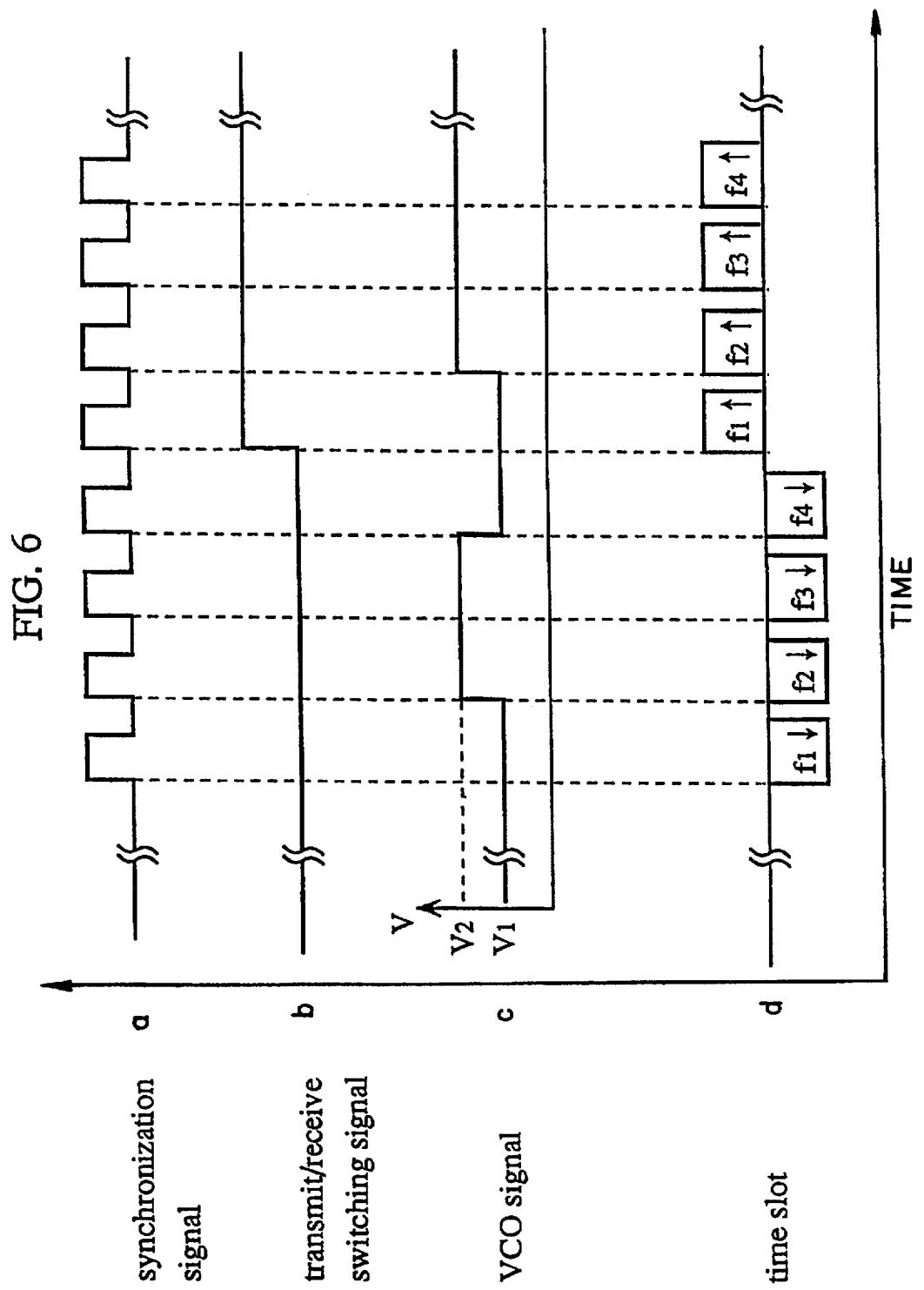
FIG. 6 is a timing chart used for explaining the function of timing controlling unit 502 of the base station of the First Embodiment of the present invention.

The following is an explanation of timing controlling unit 502 with reference to the timing chart of FIG. 6. (a), (b), and (c) of FIG. 6 respectively are synchronization signal, transmit/receive switching signal, and VCO signal output from timing controlling unit 502 based on the instructions of CPU 411. (d) of FIG. 6 shows a TDMA time slot which is generated by the base station 301 if the above three signals have the waveforms as shown in the figures. The synchronization signal indicates the start timing of each time slot. The transmit/receive switching signal indicates the direction (upward or downward) of the communication of each time slot (LO level is for downward communication; HI level is for upward communication). VCO signal specifies the carrier frequency of each time slot (voltage levels V1 and V2 of the VCO signal correspond respectively to carrier frequencies f1 and f2). The components 402, 403, 404, 501, 503, and 504 synchronize in their operation timing, switch the operation mode, or generate the carrier frequency. As a result, as shown in (d) of FIG. 6, the time slot composition is determined by the timing, the direction of communication, and frequency. That is, assignment of the time slots is determined by the combination of the above three signals output by timing controlling unit 502 based on the instructions of CPU 411.

Voice codec 406 for converting aural signal to digital data or vice versa includes an A/D converter, an D/A converter, a coder, and a decoder.

Line controlling unit 409 connects or disconnects base station 301 and communication network 305.

Memory 412 includes a ROM storing the programs to control the components and a RAM for temporary storage.

Input/output 413 includes a keyboard and a liquid crystal display (LCD) for an operator to interact with base station 301.

CPU 411 operates according to the programs stored in memory 412, controls components 501–505, 406, 409, 412 and 413 connected to CPU 411 via bus 410, and inputs/outputs data.

Figure 7:
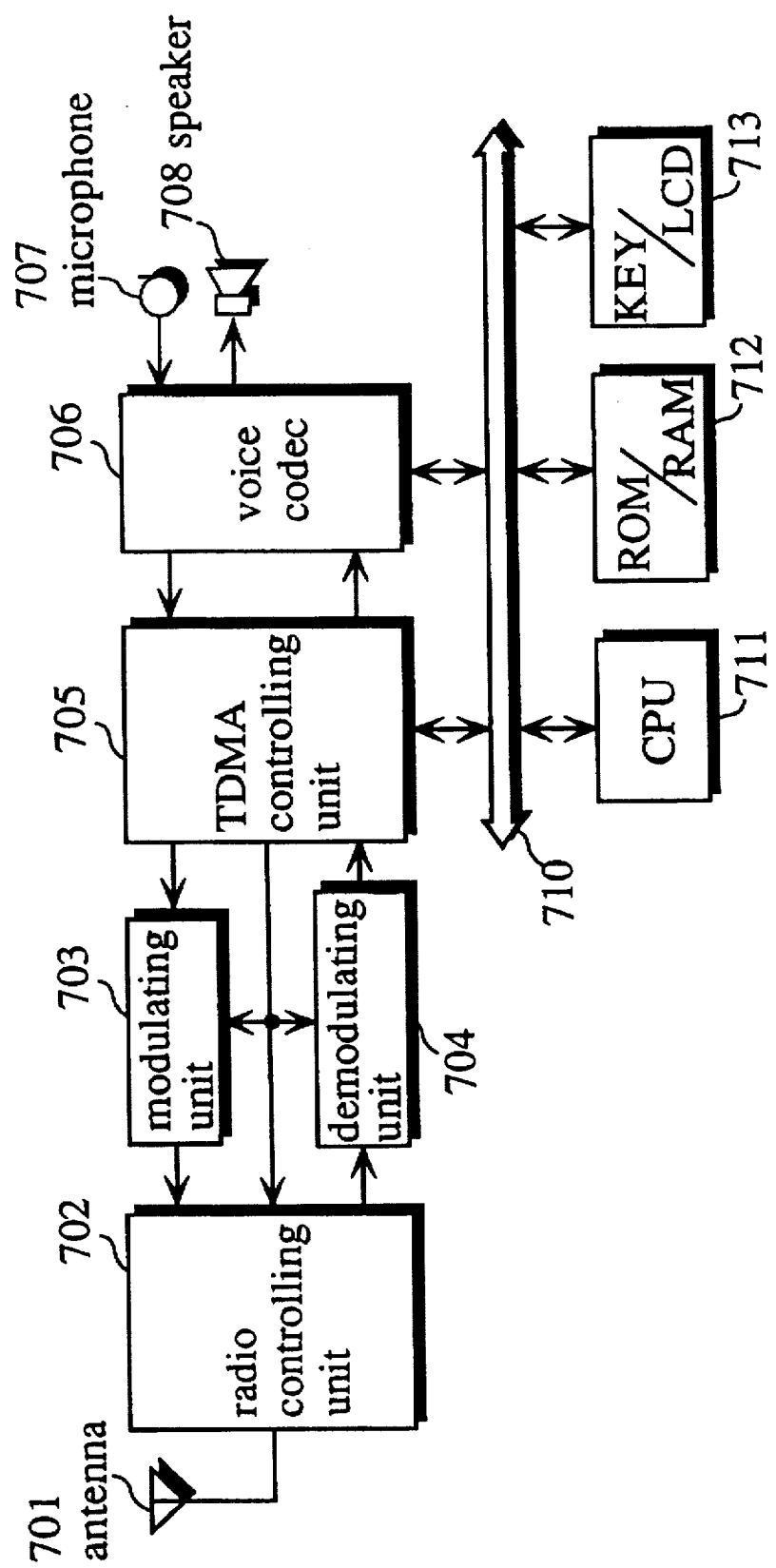
FIG. 7 is a block diagram illustrating the structure of the mobile station of the First Embodiment of the present invention.
Figure 8:
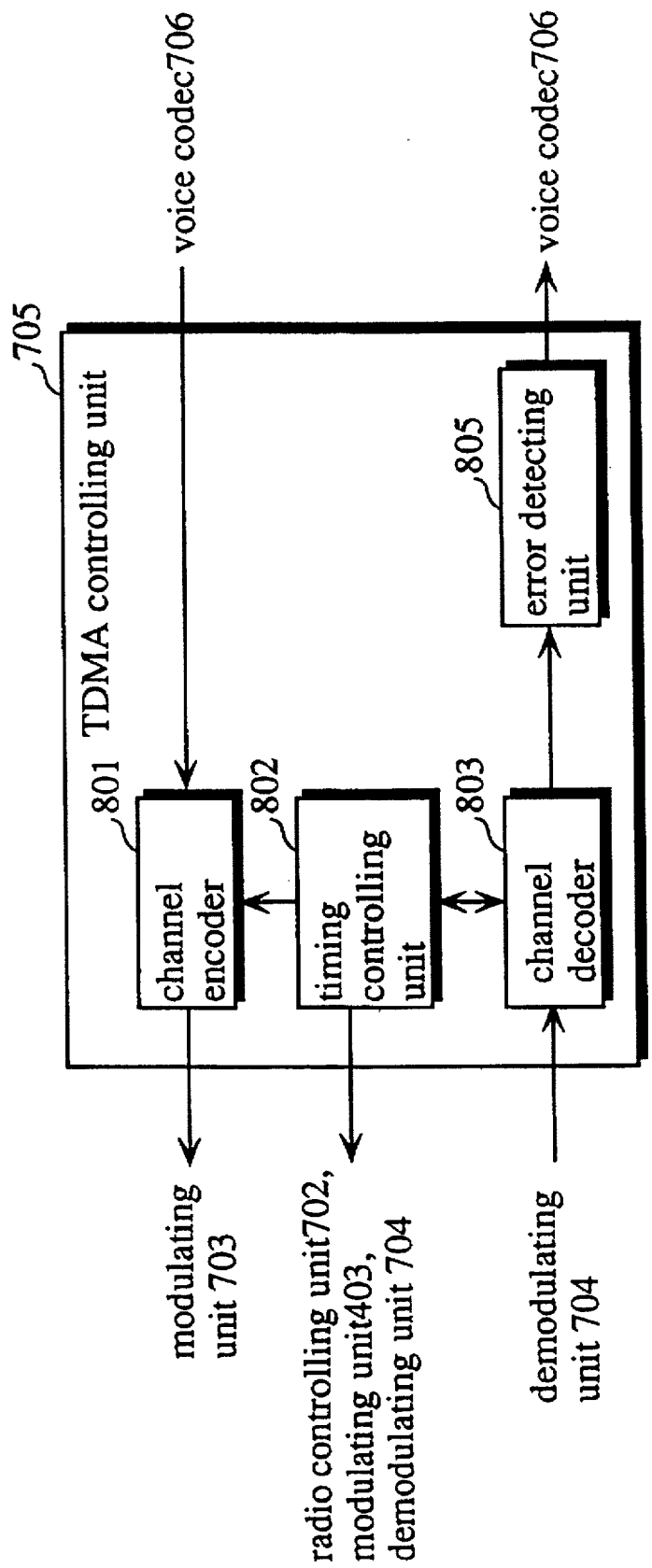
FIG. 8 is a block diagram illustrating the structure of TDMA controlling unit 705 of a mobile station of the First Embodiment of the present invention.

FIG. 7 is a block diagram illustrating the internal structure of mobile stations 302, 303, and 304 of FIG. 3. The internal structure of them is the same as that of base station 301 shown in FIG. 4 except that mobile stations do not have line controlling unit 409. FIG. 8 is a block diagram illustrating the detailed structure of TDMA controlling unit 705. The structure of it is the same as that of TDMA controlling unit 405 of base station 301 shown in FIG. 5 except that the controlling unit of the mobile station does not have traffic monitoring unit 504. The operation of timing controlling unit 802 is basically the same as that of timing controlling unit 502 of the base station except that timing controlling unit 802 generates the synchronization signal shown in FIG. 6(a) dependently, that is, in synchronization with the signal transmitted from base station 301.

The following is an explanation of the operation of base station 301 with the above components and mobile stations 302, 303, 304. The First Embodiment explains two cases: a case where a channel (ch2) is additionally assigned to mobile station 302 when a channel (ch1) has been used in the communication with base station 301 so that the two channels can be used; and a case where a channel is released from mobile station 302 when two channels (ch1 and ch2) have been used in the communication with base station 301. Note that one channel is a pair of upward and downward time slots.

The process of changing the distribution of time slots begins when any component of base station 301 sends an interruption signal and a time slot distribution change request notification to CPU 411. There are two kinds of notifications: time slot acquisition request and time slot release request. FIG. 9 shows a time slot acquisition request notification; FIG. 10 a time slot release request notification. A component stores a notification in memory 412 when it issues such request, and CPU 411 reads the notification.

In the present embodiment, it is assumed that traffic monitoring unit 504 of TDMA controlling unit 405 issues the time slot acquisition/release request. That is, traffic monitoring unit 504 issues the time slot acquisition/release request to CPU 411 based on the traffic of the communication channels monitored.

Figure 11:
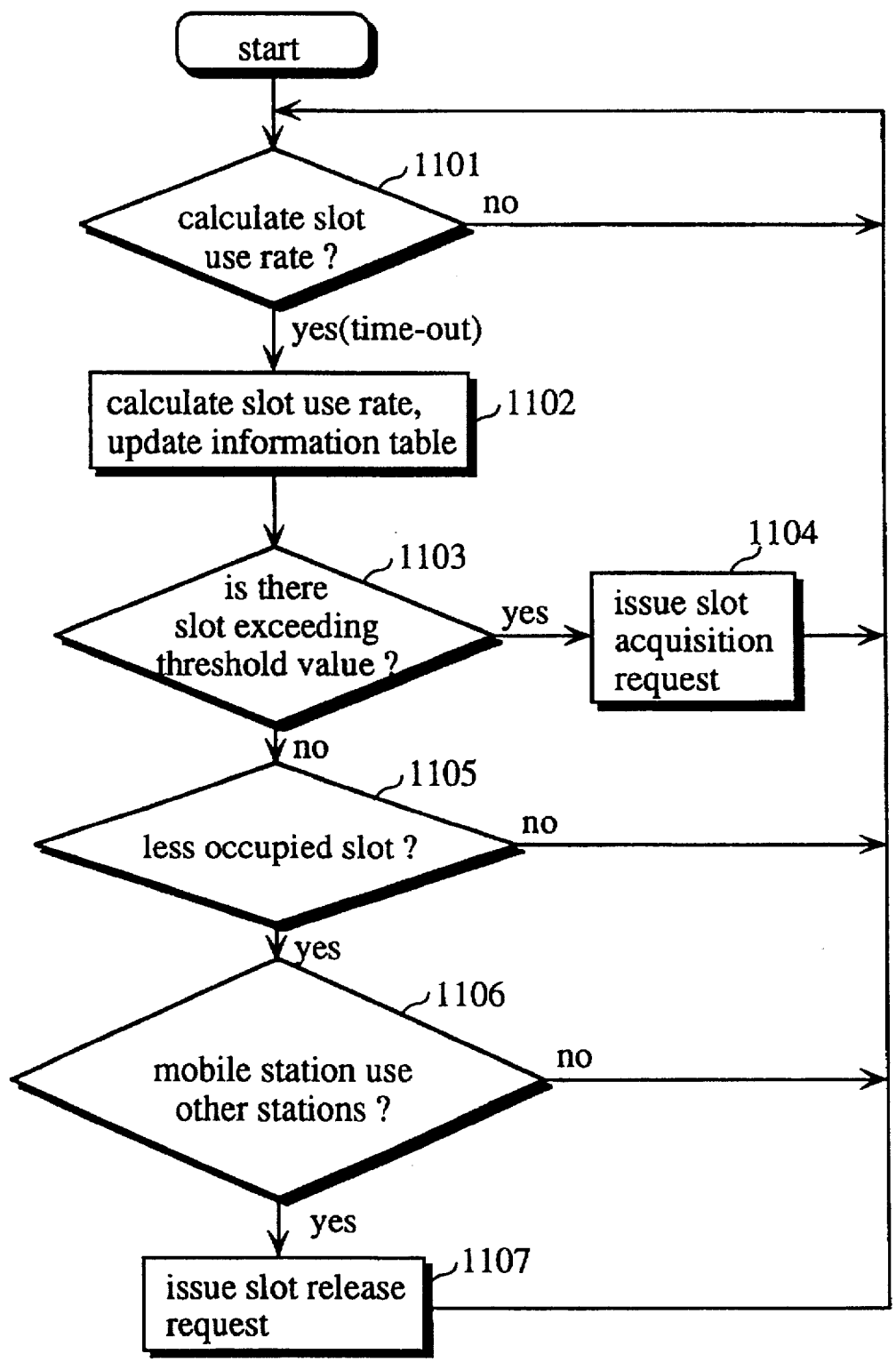
FIG. 11 is a flowchart showing the operation of traffic monitoring unit 504 of the First Embodiment of the present invention.

FIG. 11 is a flowchart showing the processes in which traffic monitoring unit 504 issues the time slot acquisition/release request to CPU 411.

Figure 12:
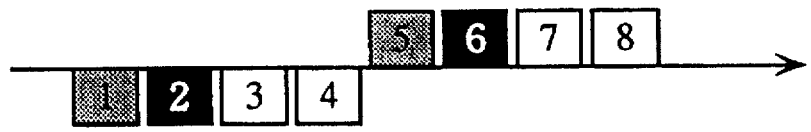
FIG. 12 shows the contents of the information table in memory 412 for controlling the time slots in the First Embodiment of the present invention.

FIG. 12 shows an information table in memory 412 made by traffic monitoring unit 504 for the operations shown in FIG. 11. The information table includes the information on each time slot of a frame such as the current packet reception rate and the number of the mobile station to which the time slots are assigned. The ROM in memory 412 stores the predetermined threshold value on the packet reception rate that is used as the standard for issuing the time slot acquisition/release request.

Traffic monitoring unit 504 is activated at every certain period (step 1101), obtains the packet reception rate (time slot use rate) of a certain period, updates the information table shown in FIG. 12 (step 1102), compares the obtained time slot use rate with the predetermined threshold value of time slot acquisition to see if there is any time slot whose use rate has exceeded the threshold value (step 1103), and, if a time slot exceeding the threshold value is found, issues the time slot acquisition request to CPU 411 (step 1104).

Then, the traffic monitoring unit 504 compares the obtained time slot use rate with the threshold value of time slot release to see if there is any less occupied time slot whose use rate is less than the threshold value (step 1105). Traffic monitoring unit 504 returns to the initial state if it does not find any less occupied time slot (step 1101). If a less occupied time slot is found, traffic monitoring unit 504 references the information table for the assignment identification, and checks to see if the mobile station using the time slot is using other time slots (step 1106). If the mobile station is using multiple time slots, traffic monitoring unit 504 issues the time slot release request (step 1107). If the mobile station is not using multiple time slots, traffic monitoring unit 504 returns to the initial state.

<acquiring time slots>

How time slots are newly assigned in the FIG. 11 flowchart is explained below with reference to FIG. 13 to FIG. 18.

Figure 13:
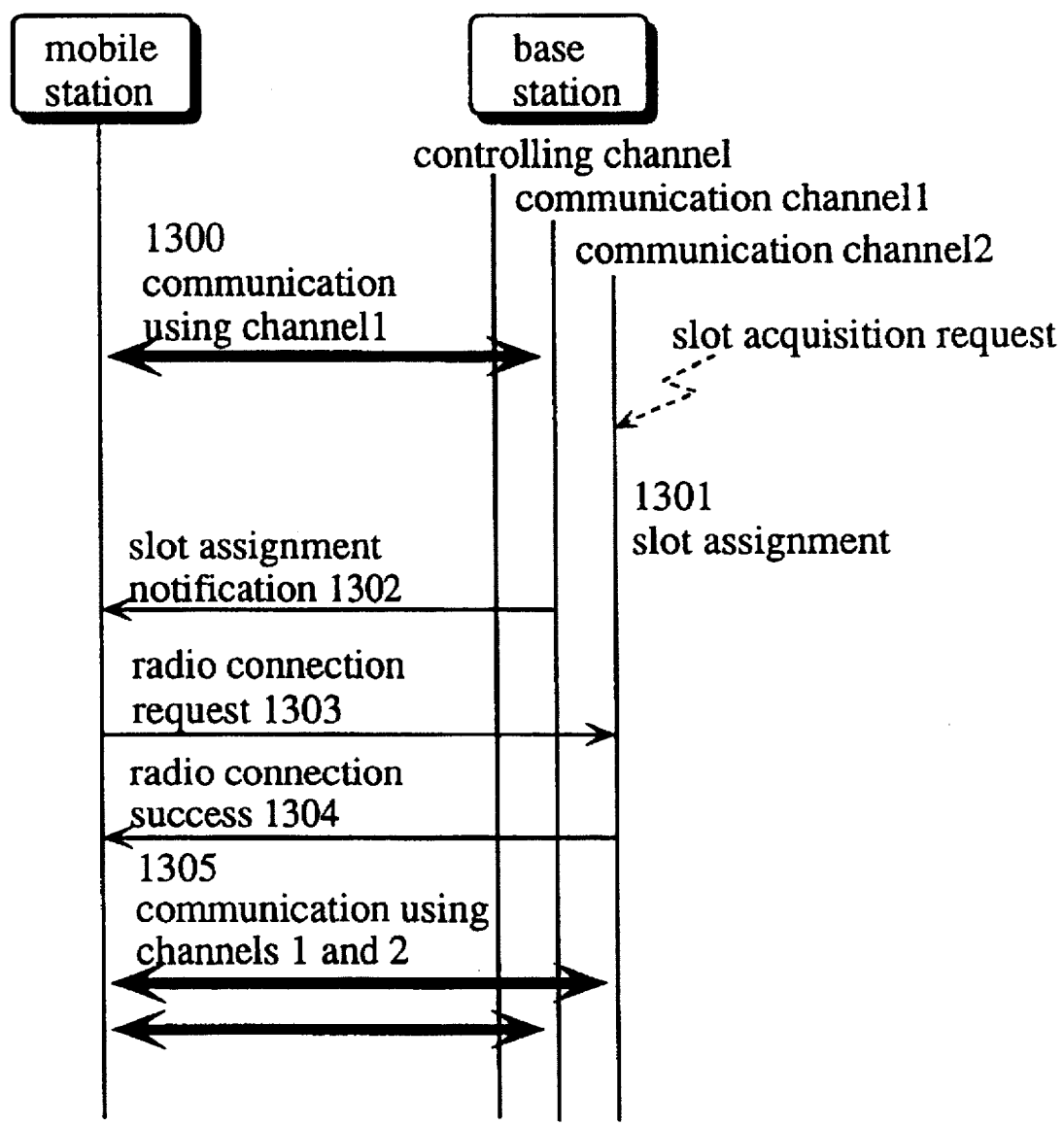
FIG. 13 shows a control sequence at time slot assignment success in the communication between the base station and mobile stations of the First Embodiment of the present invention.

FIG. 13 shows a control sequence in the communication between base station 301 and mobile station 302 after CPU 411 of base station 301 receives the time slot acquisition request. The figure shows time slots are assigned for the request and the communication using the time slots succeeds in radio connection. Note that base station 301 communicates with mobile station 302 using the channels operating with TDMA: control channel for sending the control signal; and communication channels for transferring the voice or data.

Mobile station 302 and base station 301 is in communication (step 1300) with channel 1 (as FIG. 12 shows, channel 1 has time slot 1 for downward communication and time slot 5 for upward communication), and traffic monitoring unit 504 is monitoring the traffic of each time slot at every certain period. If other time slots are required due to traffic increase and CPU 411 receives the time slot acquisition request, CPU 411 assigns time slots to the requesting mobile station (step 1301). Base station 301 transmits the time slot assignment notification signal to mobile station 302 via radio communication (step 1302). FIG. 14 shows a time slot assignment notification signal. The time slot assignment notification signal includes the identifiers of the assigned time slots (time slot numbers) and the information on the carrier (carrier frequency) used in the communication. Mobile station 302, which is to change the distribution of time slots, issues the radio connection request for the radio communication to base station 301 using the newly assigned time slot and carrier (step 1303). When the radio connection request is issued, base station 301 and mobile station 302 connect the communication channel including the newly assigned time slots and carrier (in the present embodiment, channel 2 having time slot 2 for downward and time slot 6 for upward and the same carrier as channel 1 is assumed to be assigned). Base station 301 sends the radio connection success to mobile station 302 if the connection of channel 2 succeeds (step 1304). On receiving the radio connection success, mobile station 302 uses two channels (channels 1 and 2) in communication with base station 301 (step 1305).

The following is an detailed explanation of the operation of base station 301 and mobile station 302 at step 1301 to 1304 in the sequence. First, the operation of base station 301 is explained.

Figure 15:
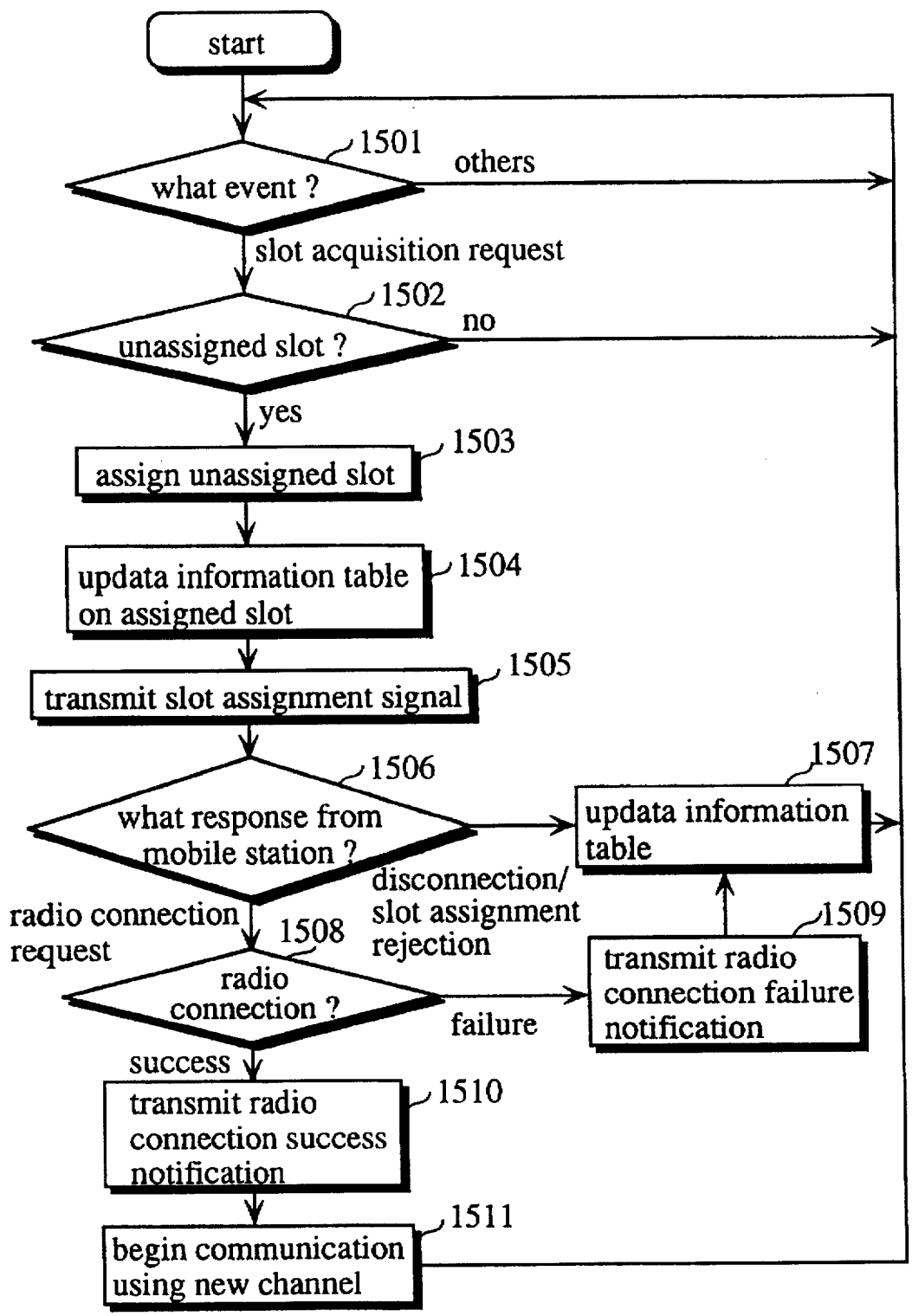
FIG. 15 is a flowchart showing the operation of the base station at time slot assignment of the First Embodiment of the present invention.

FIG. 15 is a flowchart showing the operation of base station 301 from the time CPU 411 receives the time slot acquisition request to the time base station 301 assigns the time slots then starts communicating with mobile station 302 using two channels.

When CPU 411 waiting for an event (step 1501) receives the time slot acquisition request, CPU 411 checks the time slot use rate to see if it is possible to assign other time slots to the mobile station (step 1502). CPU 411 references the information table of FIG. 12 to see if there are any time slots which are not assigned to any mobile stations. CPU 411 decides to assign time slots if there are such time slots. In FIG. 12, time slots 2, 4, 6, and 8 can be used. If no time slot is available, CPU 411 returns to the event waiting state. If time slots are available, CPU 411 assigns some of the time slots according to the request by the mobile station (step 1503). CPU 411 updates the information table by writing the number of mobile station to which the time slots are assigned in the mobile station number field of the time slots (step 1504).

CPU 411 makes the time slot assignment notification signal including the information on the assigned time slots and the carrier frequency used in the communication, and transmits the signal to the mobile station via TDMA controlling unit 405, modulating unit 403, and radio controlling unit 402 (step 1505). As is understood from the time slot assignment notification signal shown in FIG. 14, time slots 2 and 6 are assigned as channel 2. In PHS, the time slot assignment notification signal can be sent to the mobile station via the Slow Associated Control Channel (SACCH)

or Fast Associated Control Channel (FACCH) which are the service channels on the communication channel.

After transmitting the time slot assignment notification signal, base station 301 waits for mobile station 302 to send the radio connection request using the newly assigned time slots and carrier (step 1506). The radio connection request can be sent as the Radio Frequency Transmission Management (RT) request via SACCH OR FACCH in PHS.

Figure 17:
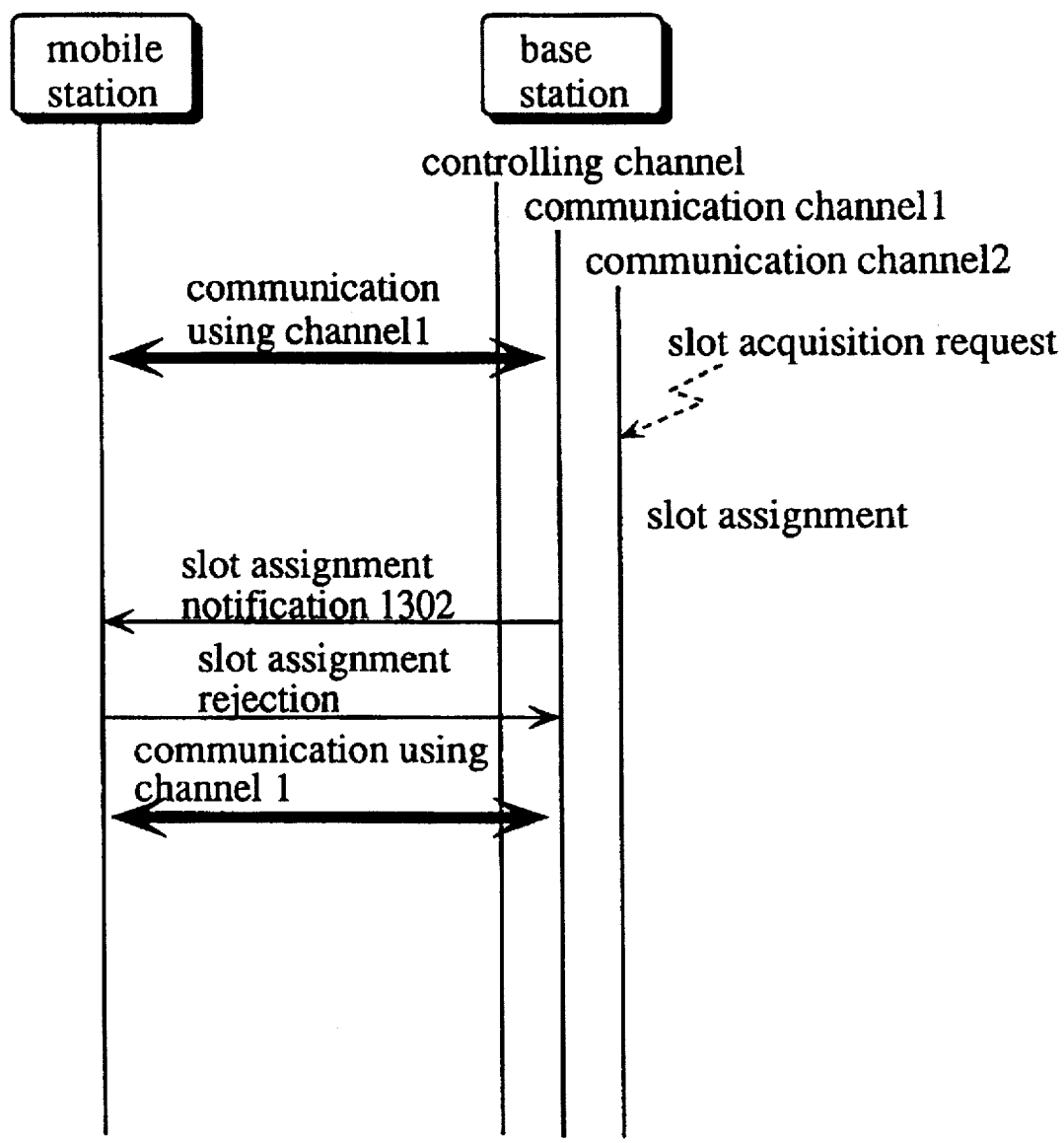
FIG. 17 shows a control sequence at time slot assignment rejection in the communication between the base station and mobile stations of the First Embodiment of the present invention.

At this stage, the mobile station may not send the radio connection request for some reasons. As one of such reasons there is a possibility that the mobile station can not use the assigned time slots and carrier. In such case, the mobile station sends the time slot assignment rejection signal as a response to the time slot assignment notification. FIG. 16 shows a time slot assignment rejection signal. FIG. 17 shows the sequence of time slot assignment rejection by the mobile station.

Furthermore, there is a possibility that the current communication itself ends. For instance, in PHS, it is the case where RT radio channel disconnection completion is sent via SACCH or FACCH. When the mobile station does not send the radio connection request using the assigned time slots and carrier for any of the reasons above, mobile station 302 cancels the time slot assignment, updates the information table by returning the information of the time slot from "assigned" to "not assigned" (step 1507), and returns to the event waiting state.

If the mobile station sends the radio connection request, base station 301 receives the request and connects the radio communication (step 1508). When failing to connect it, base station 301 sends the radio connection failure to the mobile station (step 1509), updates the information table by returning the information on the time slot from "assigned" to "not assigned" (step 1507), and returns to the event waiting state (step 1501). On the other hand, when the radio communication is connected, CPU 411 sends the radio connection success to mobile station 302 via TDMA controlling unit 405, modulating unit 403, and radio controlling unit 402 (step 1510). The radio connection success can be sent as the RT request response via SACCH or FACCH in PHS.

Then, CPU 411 sets timing controlling unit 502 to use both the old channel and the new channel, and begins communicating with mobile station 302 (step 1511).

The following is an detailed explanation of the operation of mobile station 302 at step 1301 to 1304 of the sequence shown in FIG. 13.

Figure 18:
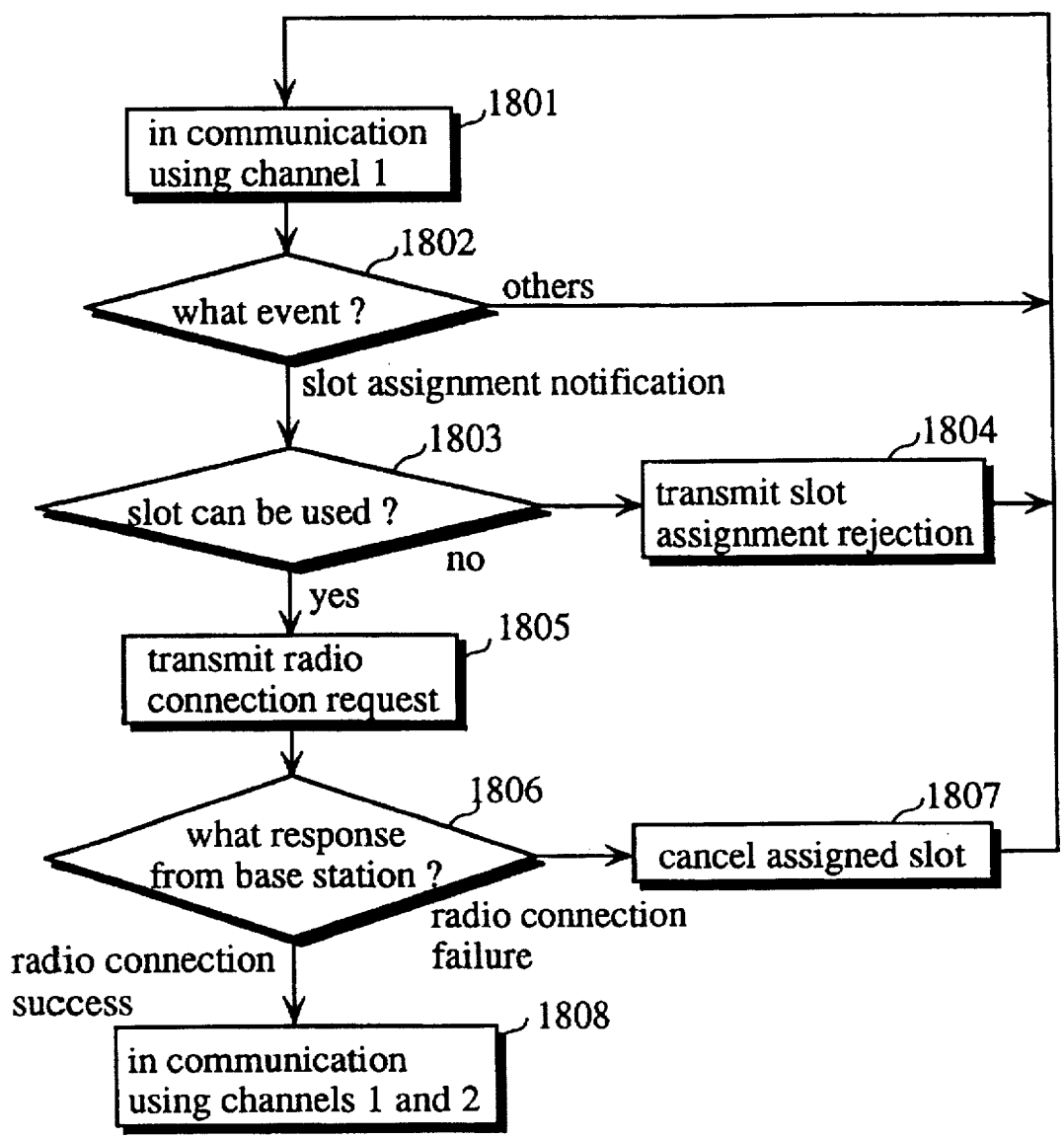
FIG. 18 is a flowchart showing the operation of the mobile station at time slot assignment of the First Embodiment of the present invention.

FIG. 18 is a flowchart showing the operation of mobile station 302 from the time the time slot assignment notification signal is input to the time the communication with the assigned time slots and carrier starts.

Mobile station 302 is in communication with base station 301 using channel 1 (step 1801). Base station 301 sends the time slot assignment notification to the mobile station via radio controlling unit 702, demodulating unit 704 and TDMA controlling unit 705 (step 1802). On receiving the notification, CPU 711 analyzes the time slot assignment notification to see if the assigned time slots can be used (step 1803).

CPU 711 issues the time slot assignment rejection signal to base station 301 when it judges that the communication using the assigned time slots and carrier is impossible due to such reason as limitations on the hardware performance of mobile station 302 (step 1804).

On the other hand, mobile station 302 issues the radio connection request using the assigned time slots and carrier to base station 301 (step 1805) when CPU 711 judges that the assigned time slots and carrier can be used. In PHS, it is when synchronization of the time slots succeeds and the system enters the multiframe acknowkedged operation mode on SACCH. Then, mobile station 302 waits for the response to the radio connection request from base station 301 (step 1806). Mobile station 302 cancels the use of the assigned time slots and carrier (step 1807) if it receives the radio connection failure from base station 301. Mobile station 302 receives the radio connection success from base station 301 if the radio connection succeeds and the communication using the assigned time slots and carrier is possible.

Then, CPU 711 sets timing controlling unit 802 to use both the old channel and the new channel, and begins communication with base station 301 (step 1808).

<releasing time slots>

How time slots being used are released in the FIG. 11 flowchart is explained below with reference to FIG. 19 to FIG. 22.

Figure 19:
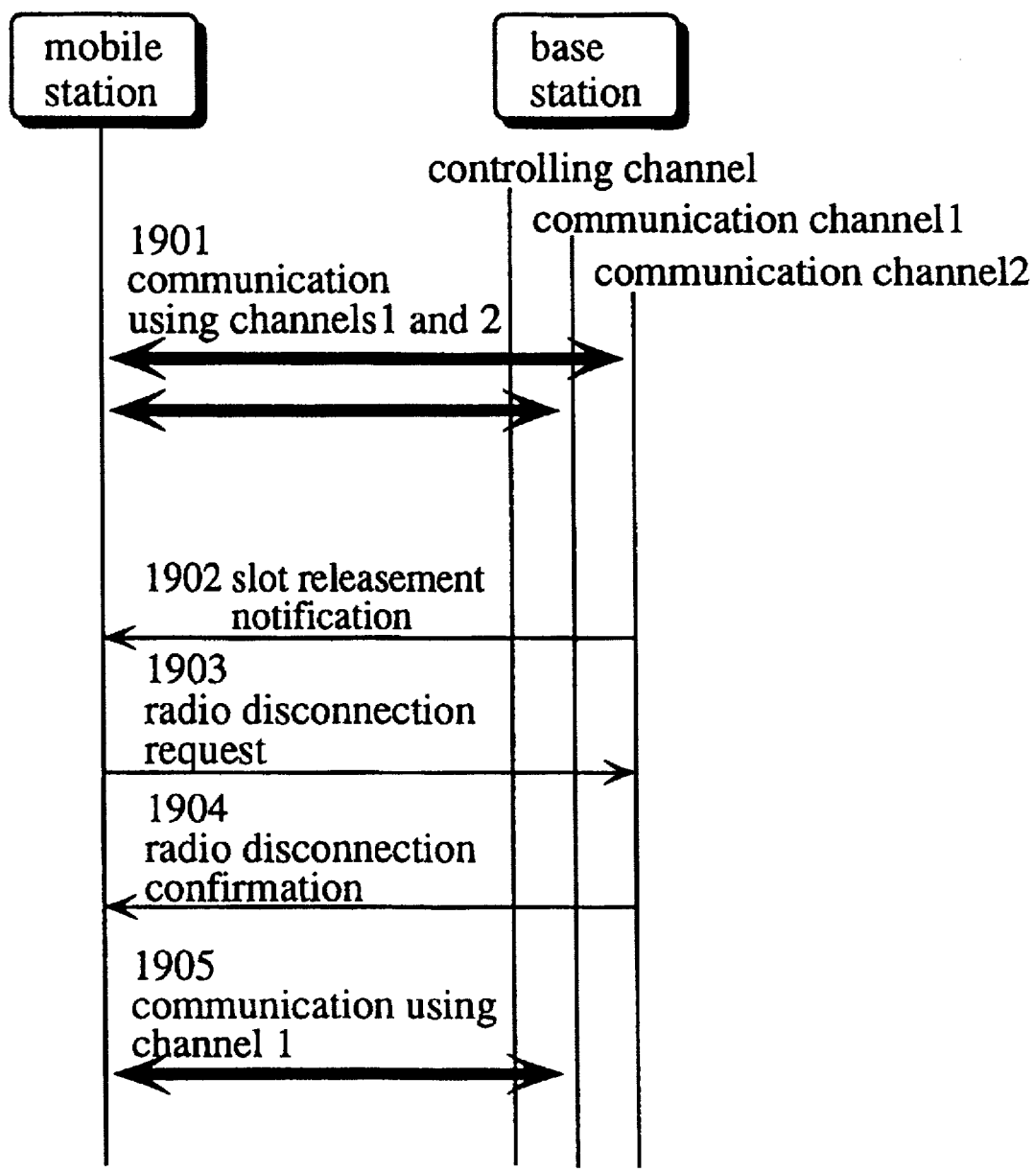
FIG. 19 is a control sequence at time slot release in the communication between the base station and mobile stations of the First Embodiment of the present invention.

FIG. 19 shows a control sequence in the communication between base station 301 and mobile station 302 after CPU 411 of base station 301 receives the time slot release request.

Mobile station 302 and base station 301 is in communication (step 1300) using two channels (each channel has a pair of upward and downward time slots) (step 1901), and traffic monitoring unit 504 of the base station is monitoring the traffic of each time slot at every certain period. Traffic monitoring unit 504 issues the time slot release request to CPU 411 when it judges that the use of multiple time slots is unnecessary because the traffic has decreased. CPU 411 sends the time slot release notification to mobile station 302 so that the mobile station releases either of the currently used two channels (step 1902). Mobile station 302, on receiving the notification, issues the radio disconnection request to end the communication using the assigned time slots and disconnect the radio communication (step 1903). Base station 301, on receiving the radio disconnection request, ends the use of the time slots of channel 2 and sends the radio disconnection confirmation to mobile station 302 as a confirmation (step 1904). The communication between base station 301 and mobile station 302 is kept by using the time slots of channel 1 which have not been released (step 1905).

The following is a detailed explanation of the operation of base station 301 and mobile station 302 at steps 1901 to 1904 of the sequence. First, the operation of base station 301 is explained.

Figure 20:
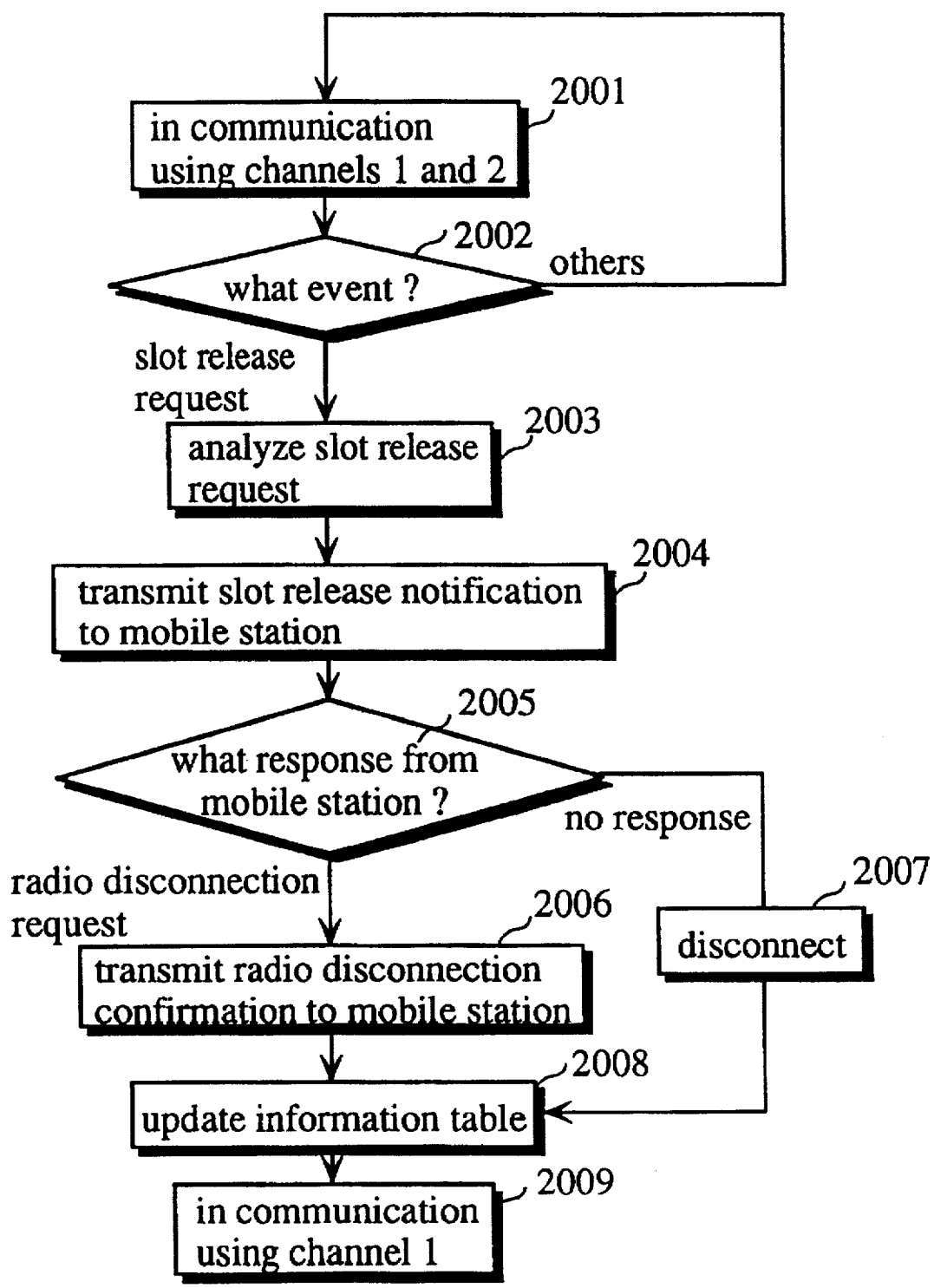
FIG. 20 is a flowchart showing the operation of the base station at time slot release of the First Embodiment of the present invention.

FIG. 20 is a flowchart showing the operation of base station 301 from the time CPU 411 receives the time slot release request to the time it releases the time slots and ends the communication.

Base station 301 and mobile station 302 are in communication using channels 1 and 2 (step 2001). When CPU 411 receives the time slot release request (step 2002), CPU 411 analyzes the request and determines the time slots to be released (step 2003). Then CPU 411 references the information table and detects the mobile station which is using the time slots to be released, and transmits the time slot release notification to the mobile station via TDMA controlling unit 405, modulating unit 403 and radio controlling unit 402 (step 2004). FIG. 21 shows a time slot release notification. In PHS, the notification can be sent to the mobile station using SACCH or FACCH of the time slots to be released.

Base station 301 sends the time slot release notification to mobile station 302 and waits for the response to come (step 2005). Mobile station 302 transmits the radio disconnection request to base station 301 to disconnect the time slots to be released. In PHS, the request can be sent using SACCH or FACCH of the time slots to be released. Base station 301, on receiving the radio disconnection request, returns the radio disconnection confirmation to mobile station 302 (step 2006), updates the information table by returning the information of the time slots from "assigned" to "not assigned" (step 2008), and sets timing controlling unit 502 to stop using the released time slots. The communication is kept using the time slots which have not been released (step 2009). For instance, in PHS, the time slots are released after the RT radio channel disconnection is sent and the radio channel is released.

When mobile station 302 does not send the radio disconnection request for a certain period it is treated as an error (step 2007). On detecting this error, base station 301 disconnects all the radio communication channels used in the communication with the mobile station. For instance, in PHS, the RTPS release is transmitted.

The following is a detailed explanation of the operation of mobile station 302 at steps 1901 to 1904 of the sequence shown in FIG. 19.

Figure 22:
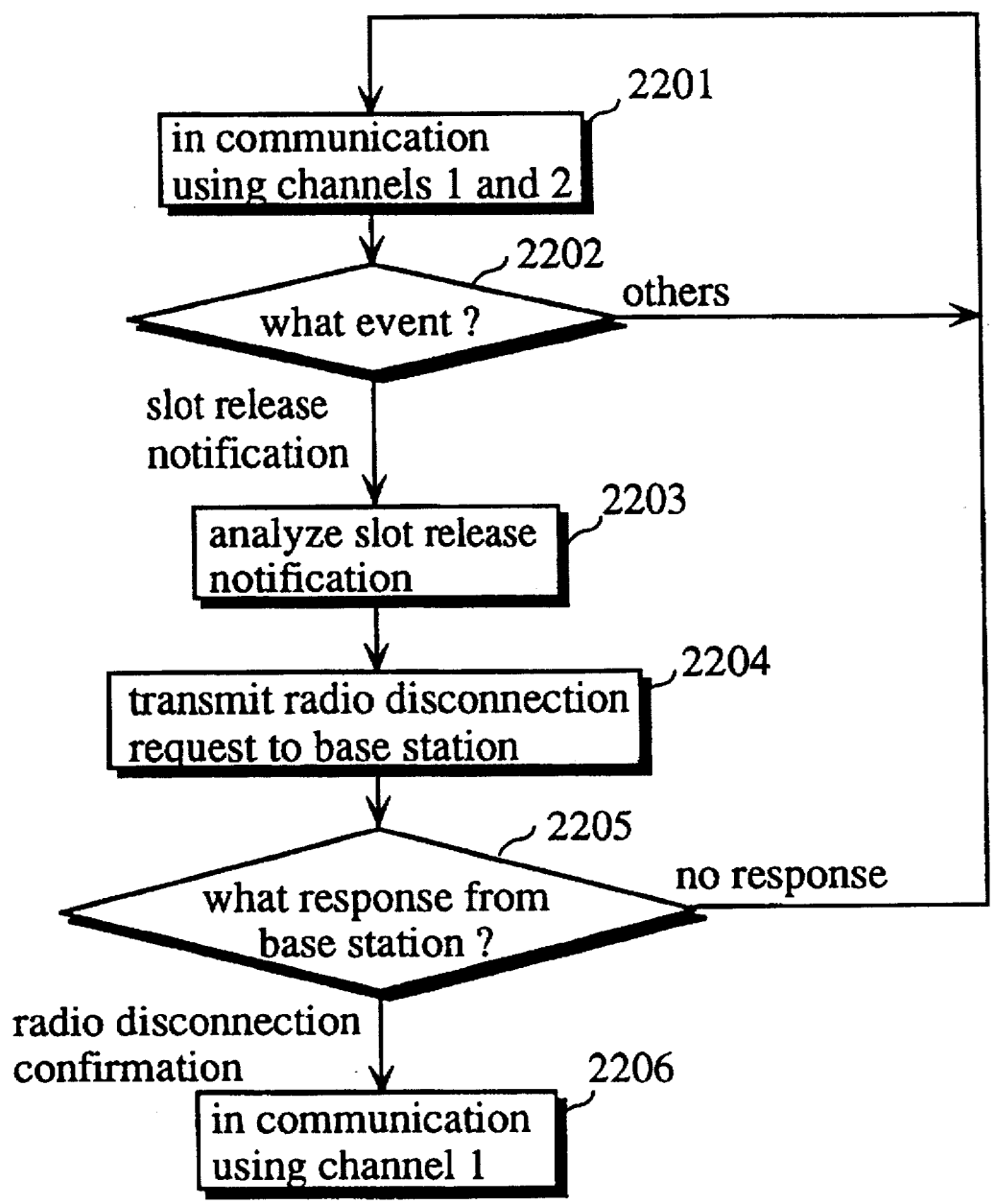
FIG. 22 is a flowchart showing the operation of the mobile station at time slot release of the First Embodiment of the present invention.

FIG. 22 is a flowchart showing the operation of mobile station 302 from the time it receives the time slot release request to the time it releases the time slots and ends the communication.

Mobile station 302 is in communication using channels 1 and 2 (step 2201). When mobile station 302 receives the time slot release request from base station 301 via radio controlling unit 702, demodulating unit 704, and TDMA controlling unit 705 (step 2202), CPU 711 analyzes the time slot release request and detects the time slots to be released (step 2203). Mobile station 302 issues the radio disconnection request concerning the detected time slots to base station 301 (step 2203). In PHS, the request can be sent using SACCH or FACCH of the time slots to be released. Mobile station 302 waits for the radio disconnection confirmation from base station 301 (step 2204). On receiving the radio disconnection confirmation, mobile station 302 stops using the released time slots (step 2205). For instance, in PHS, after the RT radio channel disconnection completion is returned to the base station and the disconnection of the radio communication is confirmed, the specified time slots are released. When base station 301 does not send the radio disconnection confirmation for a certain period, the release of the time slots is canceled and the communication is continued.

As shown in the above description, in the First Embodiment the number of the assigned time slots can be changed dynamically based on the change of the communication traffic. This enables the flexible radio communication system in which mobile stations can acquire multiple time slots to transfer large quantity of data. This also enables the increased communication speed because the system is not limited for the use of time slots. Such system can be effective for communication services such as image transfer that require high-speed data transfer or a communication service that require real time data transfer. Also, the total efficiency of the communication network is increased because the time slots can be converted from a small-traffic mobile station to a large-traffic mobile station.

<Second Embodiment>

The hardware configuration of the radio communication system of the Second Embodiment is the same as the First Embodiment. So, the components shown in FIGS. 4 to 7 and the information table of FIG. 12 of the First Embodiment are conveniently used for explaining the present embodiment.

Figure 23:
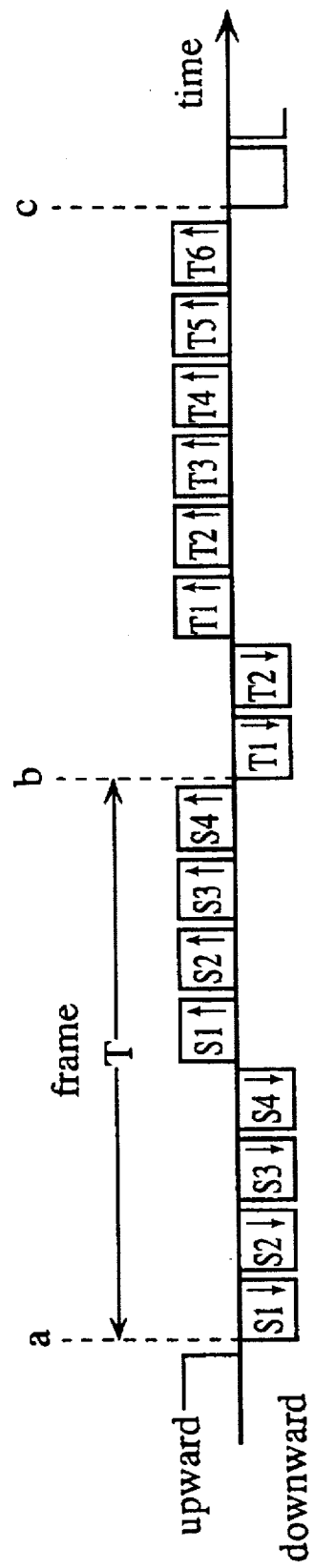
FIG. 23 shows the TDMA time slot composition of the radio communication system of the Second Embodiment of the present invention.

FIG. 23 shows TDMA frame structure of the radio communication system of the Second Embodiment of the present invention. The horizontal line indicates the time. Beside the horizontal line are placed the eight time slots which compose a TDMA frame with period T. The time slots above the line are used for upward communication (mobile station→base station); time slots below the line downward communication (base station→mobile station).

Figure 24:
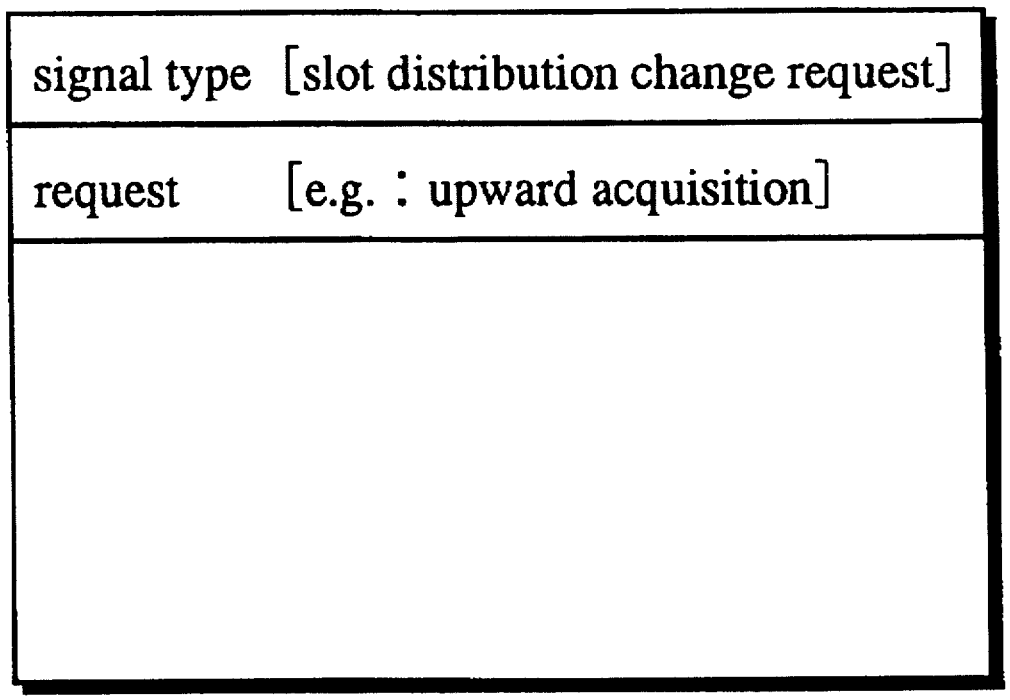
FIG. 24 shows the contents of a time slot distribution change request of the Second Embodiment of the present invention.

Traffic monitoring unit 504 of base station 301 monitors the use rate of each of upward and down ward time slots. Traffic monitoring unit 504 compares the use rate with the predetermined threshold value, and issues the time slot distribution change request to CPU 411 if it determines that the use of upward and downward time slots are unbalanced. FIG. 24 shows a time slot distribution change request. There are three kinds of time slot distribution change request: "upward acquisition" for obtaining more upward time slots; "downward acquisition" for obtaining more downward time slots; and "initial state" for returning to the original time slot distribution.

Figure 25:
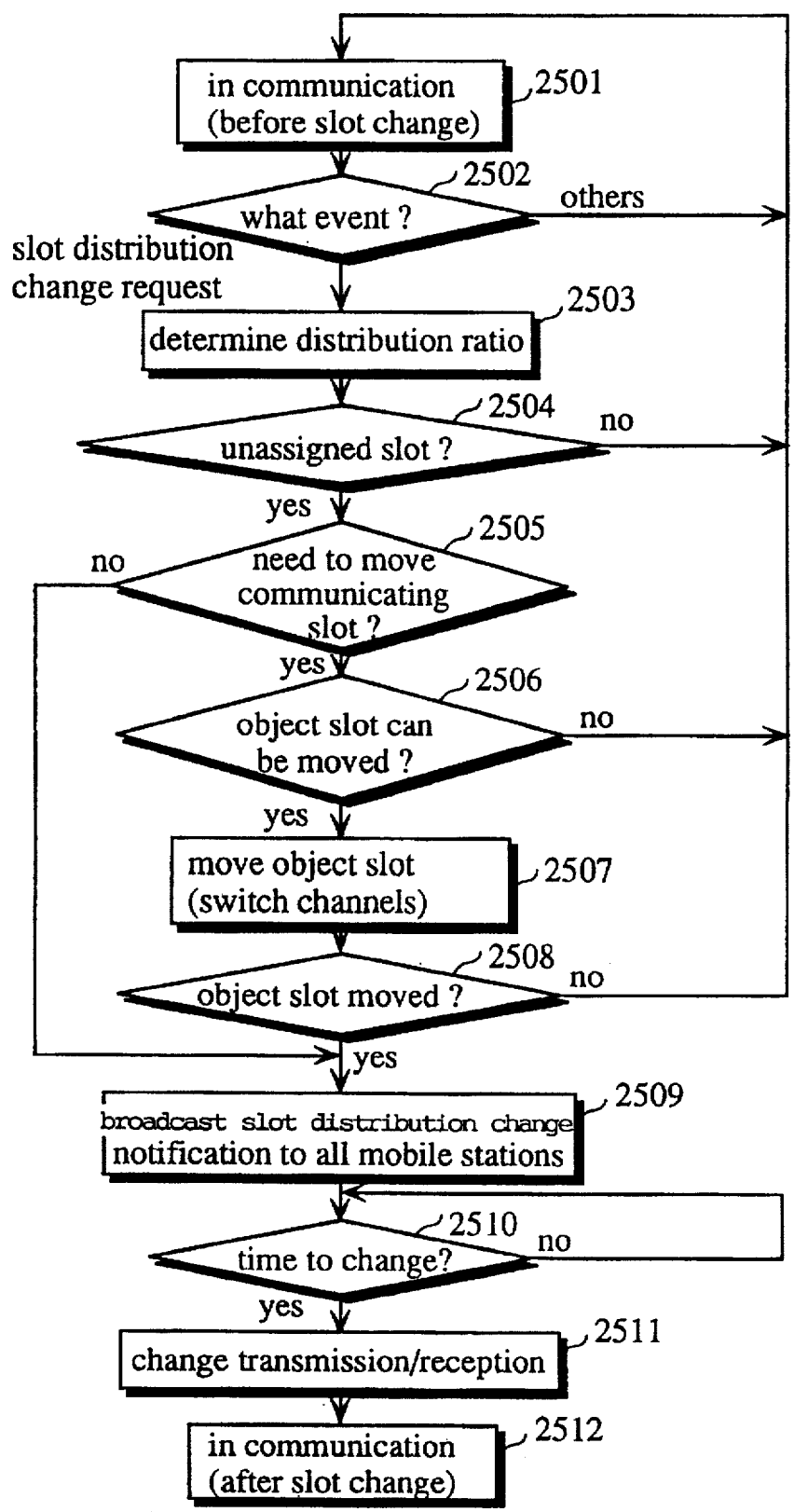
FIG. 25 is a flowchart showing the operation of the base station at time slot distribution change of the Second Embodiment of the present invention.

FIG. 25 is a flowchart showing the operation of base station 301 from the time CPU 411 receives the time slot distribution change request to the time the process completes. In the present Embodiment, it is assumed as follows: traffic monitoring unit 504 inputs the "upward acquisition" time slot distribution change request to CPU 411, and the time slot distribution ratio is changed from between points a and b of FIG. 23 (upward:downward=4:4) to between points b and c (upward:downward=2:6).

On receiving the request, CPU 411 checks to see if the time slot distribution change is possible (step 25). In this case there are eight kinds of time slot distribution ratios as shown in FIG. 26. The time slot distribution ratios are stored in memory 412 with their corresponding codes as shown in the left column of FIG. 26. CPU 411 recognizes the time slot distribution ratios by their corresponding codes in FIG. 26. CPU 411 changes the time slot distribution ratio in the direction of increasing the upward time slots when it receives "upward acquisition" request (step 2503); in the direction of increasing the downward time slots when "downward acquisition".

CPU 411 references the information table of FIG. 12 to see if there are unassigned time slots (step 2504). CPU 411 determines that time slot distribution change is impossible and returns to the initial state (step 2501) if any downward time slot cannot be found for "upward acquisition" request, or any upward time slot cannot be found for "downward acquisition" request. When a time slot is found, CPU 411 checks to see if the direction of the time slot can be changed without moving the time slots (step 2505). See FIG. 23. For example, if downward time slot S4, a target for upward time slot, is being used in a communication, the communication needs to be converted to S2, for example. In that case, CPU 411 checks to see if the time slot in communication (S4) can be moved (step 2506). When the time slot in communication cannot be moved due to the limited function of mobile station 302 or other reason, the time slot distribution change is canceled. In PHS, whether the time slot can be moved can be found by checking the channel switching ability of each mobile station in advance using the RT function request. Also in PHS, the Traffic Channel (TCH) switch function can be used for moving time slots.

When the time slot have been moved or the time slot need not be moved (step 2508), CPU 411 includes the code of time slot distribution into the time slot distribution change notification, and sends the notification to all the mobile stations in the radio area to broadcast them the new time slot distribution (step 2509).

FIG. 27 shows a time slot distribution change notification. It is assumed that a time slot is used for broadcasting. For example, time slot S1 in FIG. 23 can be used as a broadcast time slot. After CPU 411 sends the time slot distribution change notification, CPU 411 is in the waiting state until it is the time slot distribution change time (step 2510). When it is the time, CPU 411 sets timing controlling unit 502 and starts data transmission/reception using the time slots of the new distribution (step 2511). As a result, the data transmission and reception of the time slots are changed. See FIG. 23. Base station 301 transmits data using time slots S1 to S4; receives data using S1 to S4 of the frame between points a and b. However, after time slot distribution change (at point b in FIG. 23), base station 301 receives data using time slots S3 and S4 As a result, base station 301 transmits data using time slots T1 to T2; receives data using T1 to T6 in the frame between points b and c. This is how base station 301 performs the time slot distribution change.

Figure 28:
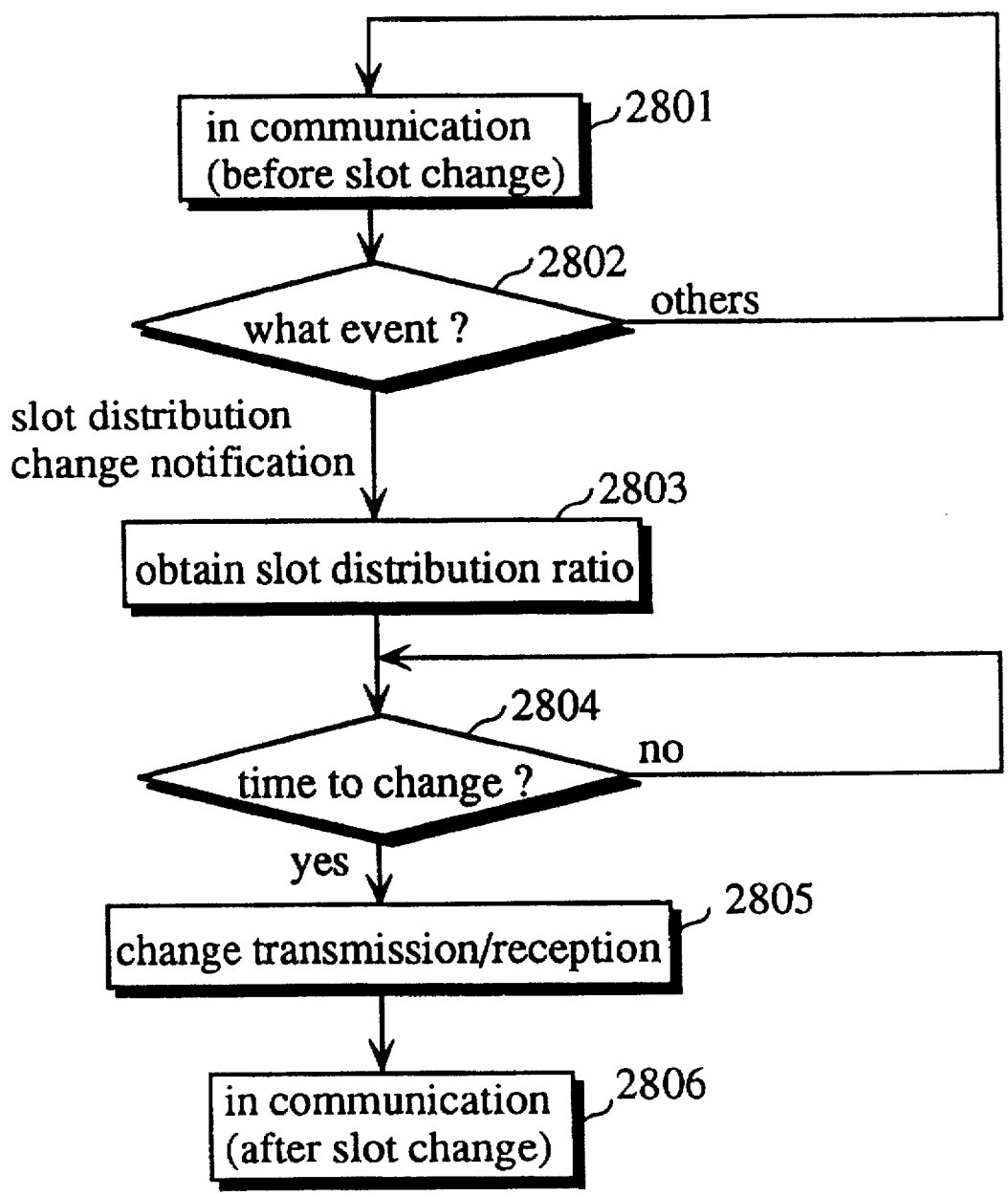
FIG. 28 is a flowchart showing the operation of the mobile station at time slot distribution change of the Second Embodiment of the present invention.

FIG. 28 is a flowchart showing the operation of mobile station 302 from the time mobile station 302 receives the time slot distribution change notification from base station 301 to the time the process completes. Mobile station 302 is in communication (step 2801). When mobile station 302 receives the time slot distribution change notification (step 2802) while monitoring notification time slot S1, it detects the new time slot distribution ratio from the notification (step 2803), and is in the waiting state until it is the predetermined time slot distribution change time (step 2804). When it is the time, mobile station 302 sets timing controlling unit 802 to change the data transmission and reception of the time slots (step 2805), and starts communicating with base station 301.

As shown in the above description, the distribution of upward and downward time slots in one frame can be changed in the Second Embodiment. This enables the flexible and efficient radio communication system. Such system will increase the communication efficiency in bidirectional file transfer, database access, and remote login, in which the traffic amount of one direction is different from that of the other direction. It also increase the communication efficiency of unidirectional communication such as broadcasting. Such system can increase the number of stations in the system because only the change in time slot distribution ratio is enough for responding to the change in the number of transmissions and receptions.

<Third Embodiment>

The hardware configuration of the radio communication system of the Third Embodiment is the same as the First Embodiment.

Figure 29:
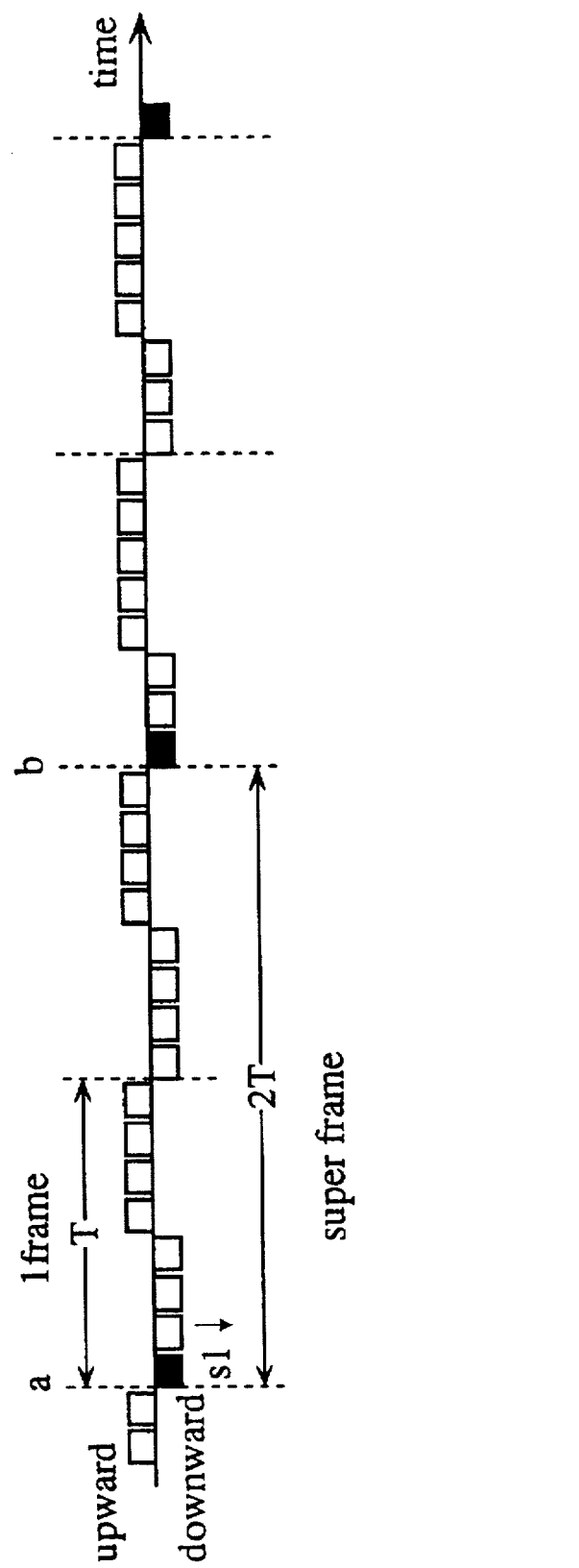
FIG. 29 shows the structure of the superframe of the Third Embodiment of the present invention.

It is defined in the Third Embodiment, as FIG. 29 shows, that the length of a frame is T, and cycle 2T which is equal to the length of two frames is a superframe. In the Third Embodiment, the superframe is used as a unit in setting or changing the distribution of the time slots, which is different from the First and Second Embodiments.

In the Third Embodiment, base station 301 changes the time slot distribution ratio in units of superframes with the same procedure as the Second Embodiment (see FIG. 25). CPU 411 distributes the time slots in units of superframes at step 2503 of FIG. 25. Note that the present Embodiment uses the information table shown in FIG. 30 instead of that shown in FIG. 12. The information table of FIG. 30 differs from that of FIG. 12 in that the time slots are managed in units of superframes.

See FIG. 30. Now, CPU 411 receives the "upward acquisition" time slot distribution change request requesting the proportion of downward:upward to be changed from 4:4 to 3:5.

First, CPU 411 checks to see if unassigned time slots can be found among downward time slots 1 to 4. However, as FIG. 30 shows, all the downward time slots are being used. So, CPU 411 checks to see if there are time slots with low packet reception rate, which are found to be time slots 3 and 4. Time slot 3 is used only by mobile station 303 for downward communication. Time slot 4 is used only by mobile station 304 for downward communication. CPU 411 changes the time slot distribution as FIG. 31 shows so that time slot 3 is shared by mobile stations 303 and 304, and that time slot 4 is released. As a result, mobile station 303 uses time slot 3 for downward communication at every two frames. This means, mobile station 303 uses time slot 3 at every first frame of superframe. On the other hand, mobile station 304, as mobile station 303, uses time slot 3 for downward communication at every two frames, but uses time slot 3 at every second frame of the superframe.

In this way, time slot 3 is used alternately by mobile stations 303 and 304 in time division as shown in FIG. 31, and time slot 4 which has been used by mobile station 304 is released to be used for upward communication.

With the above processes, base station 301 sets a new time slot distribution. Then, base station 301 includes the newly set time slot distribution information (in practice, "mobile station" column of FIG. 31) into the time slot distribution change notification, and sends the notification to mobile stations 303 and 304 (step 2509). CPU 411 of base station 301 sets timing controlling unit 502 so that data is transmitted/received using the new time slot distribution.

On the other hand, mobile stations 303 and 304 obtain information on the new time slot distribution and on the time slots assigned to them from the received time slot distribution change notification, and set timing controlling unit 802 so that they transmit/receive using the new time slot distribution.

As shown in the above description, base station 301 and mobile stations 302, 303, and 304 have succeeded in having another upward time slot and in changing the proportion of time slots (downward:upward) from 4:4 to 3:5 without halting the communications. This enables the flexible and efficient radio communication system. Such system can increase the number of mobile stations that are simultaneously in communication in the system because one time slot can be shared by multiple mobile stations and the number of time slots per one frame need not be changed. With such system, a base station can communicate with limitless number of mobile stations.

Although the above Embodiments explain the radio communication system of the present invention in detail, the applications of the invention are not limited to the above embodiments. That is:

(1) In the First Embodiment, a communication channel is used to transfer the time slot assignment notification between the base station and mobile stations, but another means may be used to transfer the notification. That is, the notification can be transferred on the controlling channel with the carrier for controlling. In PHS, controlling channel SCCH can be used for assigning the time slots.

(2) In the First Embodiment, base station 301 sends the time slot assignment notification to mobile station 302. The notification may includes, as optional, the information on the time when the system is converted to the new time slot distribution.

(3) In the First Embodiment, traffic monitoring unit 504 of base station 301 monitors the increase and decrease of the traffic and issues the time slot acquisition request notification or the time slot release request notification to CPU 411. However, another means may issue the notifications. For example, the mobile stations can send the notifications to the base station based on the traffic change if they have the same function unit as traffic monitoring unit 504.

(4) In the First Embodiment, the time slot acquisition request notification or the time slot release request notification is issued based on the traffic change. However, the issuance of the notifications may be determined on another criterion. That is, the operators of the base station and mobile stations may instruct the issuance of such notification by the input on the keyboards (input/output units 413 and 713 of base station and mobile stations). Also, the notifications may be issued based on the detection results of error detecting units 505 and 805 of the base station and mobile stations. Also, the operators may instruct the distribution of time slots prior to the communication. Furthermore, the time slogs to be used may be changed based on the error occurrence rate of the mobile stations on the transmitted or received data.

(5) In the First Embodiment, a communication using one channel receives additional channel. However, two channels may be assigned from the beginning in such a case where an optional communication service of the radio communication system informs the necessity of multiple channels in advance. Also, mobile stations may issue the time slot acquisition request when they start to transmit data, or the base station may assign multiple time slots according to the types of services provided for the user and issue the time slot assignment notification to the mobile station when it starts receiving data.

(6) In the First Embodiment, only one channel is released when two channels are used, but both two channels may be released at once.

(7) In the Second Embodiment, when time slots being used need to be moved in time slot distribution change, first the time slot is moved, and then the time slot distribution change notification is issued. However, there may be another procedure. For example, as shown in the Third Embodiment, while the time slot distribution change notification is being sent, the new time slot distribution may be determined so that moving the time slots and changing the time slot distribution are simultaneously done at the predetermined timing.

(8) In the Third Embodiment, the length of the superframe is equal to that of two frames, but it may be that of three frames and more.

(9) In the Second and Third Embodiments, the timing for changing the time slot distribution is predetermined. However, the timing need not be predetermined. For example, the timing may be specified while the time slot distribution change notification is being sent.

(10) In the Second and Third Embodiments, a time slot of a communication channel is used as the notification time slot in sending the time slot distribution change notification. However, the controlling channel may be used instead.

(11) The First, Second, and Third Embodiments may be combined to make a method in which an optimal number of time slots are assigned to the mobile stations and the time slot distribution ratio can be changed.

What is claimed is:

1. A radio communication system comprising a base station and a plurality of mobile stations for performing communications by Time Division Multiple Access (TDMA) with a certain number of time slots per one frame, wherein said base station and said plurality of mobile stations start performing a communication by TDMA with an initial assignment of said certain number of time slots per one frame, said base station comprising:

a time slot reassigning means for reassigning a required number of time slots to each of said plurality of mobile stations;

a reassignment notifying means for sending information of said time slots reassigned by said time slot reassigning means to each of said plurality of mobile stations;

a first TDMA means for performing multiple communications with each of said plurality of mobile stations by controlling switching of an operation mode between a transmission mode and a reception mode and by controlling timing for switching said operation mode according to said information of said time slots; and a transmission rate calculating means for calculating an actual transmission rate of communication data for each time slot, wherein said actual transmission rate is a ratio of a data amount having been actually transmitted to a data amount that can be transmitted in a unit time, and each mobile station comprising:

a reassignment obtaining means for obtaining said information of said time slots form said base station; and a second TDMA means for performing multiple communications with said base station by controlling switching of said operation mode between said transmission mode and said reception mode and by controlling timing for switching said operation mode according to said information of said time slots, wherein said time slot reassigning means reassigns said required number of time slots to said mobile stations based on said actual transmission rate calculated by said transmission rate calculating means.

2. The radio communication system defined in claim 1 wherein said time slot reassigning means further comprises:

a first judging means for judging whether said actual transmission rate of communication data calculated by said transmission rate calculating means exceeds a threshold value;

a time slot specifying means for specifying said appropriate number of time slots among time slots of the same frame when said first judging means judges that said transmission rate exceeds said first threshold value; and a first reassigning means for reassigning said time slots specified by said time slot specifying means to said mobile station in addition to said time slots having been reassigned to said mobile station.

3. The radio communication system defined in claim 2 wherein said time slot specifying means specifies said appropriate number of time slots among time slots of the same frame which are not used by any of said other mobile stations.

4. The radio communication system defined in claim 3 wherein said time slot specifying means specifies time slots with the same communication direction as that of said time slot judged by said first judging means that its transmission rate exceeds said first threshold value.

5. The radio communication system defined in claim 3 wherein said time slot specifying means specifies time slots with a communication direction different from that of said time slot judged by said first judging means that said time slots transmission rate exceeds said first threshold value.

6. The radio communication system defined in claim 2 wherein said time slot specifying means specifies said appropriate number of time slots among time slots which are used by other mobile stations.

7. The radio communication system defined in claim 6 wherein said radio communication system performs communications with superframes, a said superframe is made of a plurality of said frames, said time slot specifying means specifies time slots with the lowest transmission rates in a certain frame in said superframe, and said first reassigning means reassigns time slots in other frames in said superframe which correspond to said time slots specified by said time slot specifying means.

8. The radio communication system defined in claim 1 wherein said time slot reassigning means further comprises:

a second judging means for judging whether said transmission rate calculated by said transmission rate calculating means is below a second threshold value; and a second reassigning means for decreasing the number of time slots in the same communication direction reassigned to said mobile station when a time slot of said mobile station in said communication direction is judged by said second judging means that its transmission rate is below said second threshold value.

9. The radio communication system defined in claim 8 wherein said second reassigning means decreases the number of time slots in the same communication direction reassigning to said mobile station to one if more than one time slot in said communication direction has been reassigned to said mobile station.

10. The radio communication system defined in claim 8 wherein said radio communication system performs communications with superframes, a said superframe is made of a plurality of said frames, and said second reassigning means reassigned a certain time slot in said superframe to said mobile station if a time slot per said frame has been reassigned to said mobile station and releases said time slot having been reassigned.

11. The radio communication system defined in claim 1 wherein said base station further comprises an inputting means for receiving a required data transmission rate specified by an operator, wherein said required data transmission rate is a data amount which said operator desires to transmit in said unit time, and wherein said time slot reassigning means reassigns said time slots based on said required data transmission rate received by said inputting means.

12. The radio communication system defined in claim 1 wherein said base station further comprises an error occurrence rate calculating means for calculating an error occurrence rate on received data for each time slot, wherein said error occurrence rate is a ratio of a number of time slots which include error data to a total number of time slots including data, and wherein said time slot reassigning means reassigns said time slots based on said error occurrence rate calculated by said error occurrence rate calculating means.

* * * * *